US011864262B2

(12) United States Patent
Liu et al.

(10) Patent No.: US 11,864,262 B2
(45) Date of Patent: Jan. 2, 2024

(54) DATA TRANSMISSION WITH EXPIRATION TIME

(71) Applicant: Qualcomm Incorporated, San Diego, CA (US)

(72) Inventors: Huichun Liu, Beijing (CN); Ozcan Ozturk, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/278,827

(22) PCT Filed: Oct. 28, 2019

(86) PCT No.: PCT/CN2019/113573
§ 371 (c)(1),
(2) Date: Mar. 23, 2021

(87) PCT Pub. No.: WO2020/088382
PCT Pub. Date: May 7, 2020

(65) Prior Publication Data
US 2022/0039198 A1    Feb. 3, 2022

(30) Foreign Application Priority Data

Oct. 31, 2018    (WO) ................ PCT/CN2018/112921

(51) Int. Cl.
*H04W 76/38*    (2018.01)
*H04W 76/25*    (2018.01)
(Continued)

(52) U.S. Cl.
CPC ....... *H04W 76/38* (2018.02); *H04W 12/0471* (2021.01); *H04W 56/0005* (2013.01);
(Continued)

(58) Field of Classification Search
CPC ..... H04W 76/38; H04W 76/25; H04W 76/22; H04W 12/0471; H04W 56/0005; H04W 72/14; H04W 80/14
See application file for complete search history.

(56) References Cited

U.S. PATENT DOCUMENTS 10,085,255 B2    9/2018  Patel et al.
10,812,982 B2    10/2020 Yerramalli et al.
(Continued)

FOREIGN PATENT DOCUMENTS

CN    101188869 A    5/2008
CN    103079176 A    5/2013
(Continued)

OTHER PUBLICATIONS

International Search Report and Written Opinion—PCT/CN2018/112921—ISA/EPO—dated Jul. 26, 2019.
(Continued)

*Primary Examiner* — Jianye Wu
(74) *Attorney, Agent, or Firm* — Holland & Hart LLP

(57) ABSTRACT

Methods, systems, and devices for wireless communications are described. A user equipment (UE) may be configured to operate in a control mode. In some cases, the control mode may be an in active mode (e.g., a radio resource control (RRC) inactive mode). The UE may be configured to receive a control message from a network node. In some cases, the control message may include an uplink grant associated with a duration. The duration may relate to a timer, such as an expiration timer, for example. The UE may transmit an uplink transmission to the network node while operating in the control mode. The uplink transmission may be in accordance with the uplink grant and the duration. In some cases, prior to transmitting the uplink transmission, the UE may multiplex the uplink transmission with a second control
(Continued)

message including an indication for the UE to remain in the control mode.

26 Claims, 18 Drawing Sheets

(51) Int. Cl.

| | | |
|---|---|---|
| H04W 76/22 | (2018.01) | |
| H04W 12/0471 | (2021.01) | |
| H04W 56/00 | (2009.01) | |
| H04W 72/02 | (2009.01) | |
| H04W 80/02 | (2009.01) | |
| H04W 72/23 | (2023.01) | |

(52) U.S. Cl.
CPC ........... *H04W 72/23* (2023.01); *H04W 76/22* (2018.02); *H04W 76/25* (2018.02); *H04W 80/02* (2013.01)

(56) References Cited

U.S. PATENT DOCUMENTS

| | | | |
|---|---|---|---|
| 11,039,302 B2* | 6/2021 | Chang | ............... H04W 72/1268 |
| 2016/0157278 A1 | 6/2016 | Casati | |
| 2018/0270700 A1 | 9/2018 | Babaei et al. | |
| 2018/0279348 A1* | 9/2018 | Huang | .................. H04W 76/27 |
| 2021/0204227 A1* | 7/2021 | Bergljung | ............. H04W 52/34 |

FOREIGN PATENT DOCUMENTS

| | | | | |
|---|---|---|---|---|
| CN | 105265009 A | | 1/2016 | |
| JP | 2020519140 A | * | 5/2018 | |
| WO | WO-2017039889 A1 | | 3/2017 | |
| WO | WO-2017076973 A1 | | 5/2017 | |
| WO | WO-2017136244 A1 | | 8/2017 | |
| WO | WO-2018143882 A1 | | 8/2018 | |
| WO | WO-2018174489 A1 | * | 9/2018 | ............ H04W 24/10 |
| WO | WO-2018175519 A1 | | 9/2018 | |

OTHER PUBLICATIONS

International Search Report and Written Opinion—PCT/CN2019/113573—ISA/EPO—dated Feb. 1, 2020.
Spreadtrum Communications: "UL Data Transmission in Inactive", 3GPP Draft, 3GPP TSG-RAN WG2 Meeting #101 bis, R2-1804471 UL Data Transmission In Inactive, 3rd Generation Partnership Project (3GPP), Mobile Competence Centre, 650, Route Des Lucioles; F-06921 Sophia-Antipolis Cedex, France, vol. RAN WG2, No. Sanya, China; Apr. 16, 2018-Apr. 20, 2018, Apr. 14, 2018 (Apr. 14, 2018), XP051428207, 2 Pages, Retrieved from the Internet: URL:http://www.3gpp.org/ftp/Meetings%5F3GPP%5FSYNC/RAN2/Docs/ [retrieved on Apr. 14, 2018].
Supplementary European Search Report—EP19879945—Search Authority—The Hague—dated Jun. 14, 2022.
VIVO: "Security Aspects in RRC Inactive", 3GPP Draft, 3GPP TSG-RAN WG2 Meeting #101, R2-1802096_Security Aspects in RRC Inactive, 3rd Generation Partnership Project (3GPP), Mobile Competence Centre, 650, Route Des Lucioles, F-06921 Sophia-Antipolis Cedex, France, vol. RAN WG2, No. Athens, Greece, Feb. 26, 2018-Mar. 2, 2018, Feb. 15, 2018 (Feb. 15, 2018), XP051399405, 3 Pages, Retrieved from the Internet: URL: http://www.3gpp.org/ftp/tsg%5Fran/WG2%5FRL2/TSGR2%5F101/Docs/ [Retrieved on Feb. 15, 2018] Section 2.1 p. 1-p. 2.

* cited by examiner

DATA TRANSMISSION WITH EXPIRATION TIME

CROSS REFERENCE TO RELATED APPLICATIONS

The present application is a 371 national phase filing of International Patent Application No. PCT/CN2019/113573 by Liu et al., entitled "DATA TRANSMISSION WITH EXPIRATION TIME," filed Oct. 28, 2019; and to International Patent Application No. PCT/CN2018/112921 by Liu et al., entitled "DATA TRANSMISSION WITH EXPIRATION TIME," filed Oct. 31, 2018 which are assigned to the assignee hereof, and which are each incorporated by reference herein in their entirety.

INTRODUCTION

The following relates generally to wireless communications, and more specifically to data transmissions associated with a duration.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

A method of wireless communication at a UE is described. The method may include operating in a control mode, receiving, from a network node, a control message, the control message including an uplink grant associated with a duration, and transmit, to the network node, an uplink transmission in accordance with the uplink grant and the duration while operating in the control mode.

An apparatus for wireless communication is described. The apparatus may include a processor, memory coupled to the processor, the processor and memory configured to operate in a control mode, receive, from a network node, a control message, the control message including an uplink grant associated with a duration, and transmit to the network node, an uplink transmission in accordance with the uplink grant and the duration while operating in the control mode.

Another apparatus for wireless communication is described. The apparatus may include means for operating in a control mode, receiving, from a network node, a control message, the control message including an uplink grant associated with a duration, and transmit, to the network node, an uplink transmission in accordance with the uplink grant and the duration while operating in the control mode.

A non-transitory computer-readable medium storing code for wireless communication at a UE is described. The code may include instructions executable by a processor to operate in a control mode, receive, from a network node, a control message, the control message including an uplink grant associated with a duration, and transmit, to the network node, an uplink transmission in accordance with the uplink grant and the duration while operating in the control mode.

In some examples of the method, apparatuses, and non-transitory computer-readable medium described herein, the control message may be encrypted based on a security key.

In some examples of the method, apparatus, and non-transitory computer-readable medium described herein, the duration may relate to an expiration timer, wherein transmitting, to the network node, the uplink transmission includes transmitting, to the network node, the uplink transmission in accordance with the uplink grant before the expiration timer lapses.

Some examples of the method, apparatuses, and non-transitory computer-readable medium described herein may further include operations, features, means, or instructions for multiplexing the uplink transmission with a second control message that includes an indication for the UE to remain in the control mode, and transmitting, to the network node, the multiplexed uplink transmission in accordance with the uplink grant.

In some examples of the method, apparatuses, and non-transitory computer-readable medium described herein, the second control message includes a release message.

Some examples of the method, apparatuses, and non-transitory computer-readable medium described herein may further include operations, features, means, or instructions for transmitting, to the network node, a second uplink transmission including a buffer status report, where the second uplink transmission occurs before the uplink transmission.

In some examples of the method, apparatuses, and non-transitory computer-readable medium described herein, the uplink grant may be based on the buffer status report, a network configuration, or a combination thereof.

Some examples of the method, apparatuses, and non-transitory computer-readable medium described herein may further include operations, features, means, or instructions for transmitting, to the network node, a second uplink transmission including a buffer status report, one or more uplink Radio Link Control (RLC) Protocol Data Unit (RLC PDU) segments, or a combination thereof, where the second uplink transmission occurs before the uplink transmission.

Some examples of the method, apparatuses, and non-transitory computer-readable medium described herein may further include operations, features, means, or instructions for receiving, from the network node, the control message based on the buffer status report, the one or more uplink RLC PDU segments, or a combination thereof, the control message including a contention resolution message and the uplink grant associated with the duration.

Some examples of the method, apparatuses, and non-transitory computer-readable medium described herein may further include operations, features, means, or instructions for determining the security key shared between the UE and the network node may be based on the control message, and encrypting the uplink transmission using the security key shared between the UE and the network node.

Some examples of the method, apparatuses, and non-transitory computer-readable medium described herein may further include operations, features, means, or instructions for receiving, from the network node, a paging message prior to receiving the control message, the paging message including a downlink data forwarding indication, and transmitting a second control message in response to the paging message, the second control message including a resume request message.

In some examples of the method, apparatuses, and non-transitory computer-readable medium described herein, the uplink grant associated with the duration includes at least one of a semi-persistent uplink resource with the duration, a dedicated uplink resource with the duration, or a combination thereof.

In some examples of the method, apparatuses, and non-transitory computer-readable medium described herein, a data size of the uplink transmission may be greater than a data size of a system information broadcast transmission. In some examples of the method, apparatuses, and non-transitory computer-readable medium described herein, the control mode includes a radio resource control (RRC) inactive mode.

A method of wireless communication at a network node is described. The method may include transmitting, to a UE, a control message while the UE is in a control mode, the control message including an uplink grant associated with a duration and receiving, from the UE, an uplink transmission in accordance with the uplink grant while the UE is in the control mode.

An apparatus for wireless communication is described. The apparatus may include a processor, memory in electronic communication with the processor, and instructions stored in the memory. The instructions may be executable by the processor to cause the apparatus to transmit, to a UE, a control message while the UE is in a control mode including an uplink grant associated with a duration, from the UE, an uplink transmission in accordance with the uplink grant while the UE is in the control mode, where the uplink transmission occurs based at least in part on the duration.

Another apparatus for wireless communication is described. The apparatus may include means for transmitting, to a UE, a control message while the UE is in a control mode, the control message including an uplink grant associated with a duration and receiving, from the UE, an uplink transmission in accordance with the uplink grant while the UE is in the control mode, where the uplink transmission occurs based at least in part on the duration.

A non-transitory computer-readable medium storing code for wireless communication at a network node is described. The code may include instructions executable by a processor to transmit, to a UE, a control message while the UE is in a control mode, the control message including an uplink grant associated with a duration, and receive, from the UE, an uplink transmission in accordance with the uplink grant while the UE is in the control mode, where the uplink transmission occurs based at least in part on the duration.

Some examples of the method, apparatuses, and non-transitory computer-readable medium described herein may further include operations, features, means, or instructions for encrypting the control message based on a security key.

In some examples of the method, apparatus, and non-transitory computer-readable medium described herein, the duration may relate to an expiration timer, and the uplink transmission occurs before the expiration timer lapses.

Some examples of the method, apparatuses, and non-transitory computer-readable medium described herein may further include operations, features, means, or instructions for receiving, from the UE, a multiplexed uplink transmission in accordance with the uplink grant, where the uplink transmission may be multiplexed with a second control message including an indication for the UE to remain in the control mode.

In some examples of the method, apparatuses, and non-transitory computer-readable medium described herein, the second control message includes a release complete message. Some examples of the method, apparatuses, and non-transitory computer-readable medium described herein may further include operations, features, means, or instructions for receiving, from the UE, a second uplink transmission including a buffer status report, where the second uplink transmission occurs before the uplink transmission.

Some examples of the method, apparatuses, and non-transitory computer-readable medium described herein may further include operations, features, means, or instructions for determining the uplink grant to be included in the control message based on the buffer status report, a network configuration, or a combination thereof.

Some examples of the method, apparatuses, and non-transitory computer-readable medium described herein may further include operations, features, means, or instructions for transmitting, to an anchor network node, a request to retrieve a context associated with the UE, and receiving, from the anchor network node, a response indicating a failure to retrieve the context associated with the UE, where transmitting the control message may be based on the received response.

In some examples of the method, apparatuses, and non-transitory computer-readable medium described herein, the request to retrieve the context associated with the UE includes at least one of a Packet Data Convergence Protocol (PDCP) Protocol Data Unit (PDCP PDU) associated with a logical channel identifier, an indication of a subsequent uplink transmission, or a combination thereof.

In some examples of the method, apparatuses, and non-transitory computer-readable medium described herein, the response indicating the failure to retrieve the context associated with the UE includes at least one of an RRC container, a downlink PDCP PDU associated with a logical channel identifier, or a combination thereof.

Some examples of the method, apparatuses, and non-transitory computer-readable medium described herein may further include operations, features, means, or instructions for receiving, from the UE, a second uplink transmission including a buffer status report, one or more uplink RLC PDU segments, or a combination thereof, where the second uplink transmission occurs before the uplink transmission, assembling the RLC PDU segments based on the second uplink transmission, and transmitting, to an anchor network node, the assembled RLC PDU segments.

Some examples of the method, apparatuses, and non-transitory computer-readable medium described herein may further include operations, features, means, or instructions for determining the uplink grant to be included in the control message based on the buffer status report, the one or more uplink RLC PDU segments, or a combination thereof, and transmitting, to the UE, the control message including a contention resolution message and the determined uplink grant.

Some examples of the method, apparatuses, and non-transitory computer-readable medium described herein may further include operations, features, means, or instructions for determining the security key shared between the UE and the network node, and indicating the security key shared between the UE and the network node using the control message, where the uplink transmission may be secured using the indicated security key.

Some examples of the method, apparatuses, and non-transitory computer-readable medium described herein may further include operations, features, means, or instructions for receiving, from an anchor network node, a paging message including a downlink data forwarding indication, transmitting, to the UE, the paging message prior to transmitting the control message, and receiving, from the UE, a second control message in response to the paging message, the second control message including a resume request message.

Some examples of the method, apparatuses, and non-transitory computer-readable medium described herein may further include operations, features, means, or instructions for transmitting, to the anchor network node, a request to retrieve a context associated with the UE, the request including a downlink forwarding tunneling information, and receiving, from the anchor network node, a response indicating a failure to retrieve the context associated with the UE, where transmitting the control message may be based on the received response.

Some examples of the method, apparatuses, and non-transitory computer-readable medium described herein may further include operations, features, means, or instructions for transmitting, to the anchor network node, a request to retrieve a context associated with the UE, receiving, from the anchor network node, a response indicating the context associated with the UE, transmitting, to the anchor network node, the request for anchor relocation, the request for anchor relocation including a downlink forwarding tunneling information, and receiving, from the anchor network node, a response confirming the request for anchor relocation.

Some examples of the method, apparatuses, and non-transitory computer-readable medium described herein may further include operations, features, means, or instructions for transmitting, to an access and mobility management function (AMF), a request for the security key based on the response confirming the request for anchor relocation, and receiving, from the AMF, the security key, where transmitting the control message may be based on the received security key.

In some examples of the method, apparatuses, and non-transitory computer-readable medium described herein, the uplink grant associated with the expiration timer includes at least one of a semi-persistent uplink resource with the expiration timer, a dedicated uplink resource with the expiration timer, or a combination thereof.

In some examples of the method, apparatuses, and non-transitory computer-readable medium described herein, a data size of the uplink transmission may be greater than a data size of a system information broadcast transmission.

In some examples of the method, apparatuses, and non-transitory computer-readable medium described herein, the control mode includes an RRC inactive mode.

DETAILED DESCRIPTION

Figure 1:
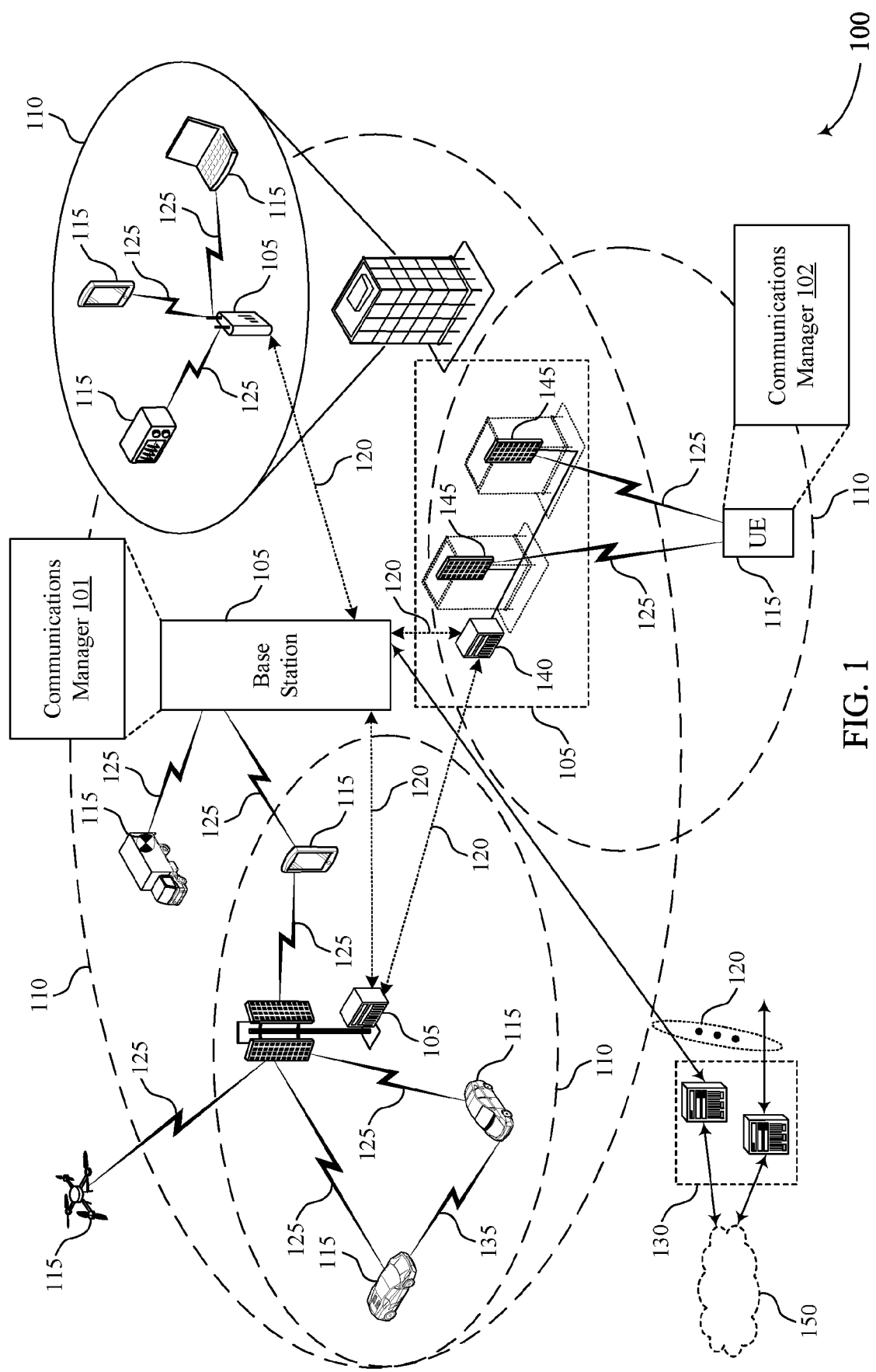
FIGS. 1 and 2 illustrate examples of wireless communications systems that support data transmission with expiration time in accordance with one or more aspects of the present disclosure.

Some wireless communication systems may include one or more communication devices, such as user equipment (UE) and base stations, for example, next-generation NodeBs or giga-NodeBs (either of which may be referred to as a gNB) that may support multiple radio access technologies including 4G systems such as Long Term Evolution (LTE) systems, fifth generation (5G) systems which may be referred to as New Radio (NR) systems. The communications devices may support various control modes (also referred to as radio resource control (RRC) modes or RRC states). In some examples, the communication devices may support various RRC modes to preserve resources (e.g., time and frequency resources), a battery life of the communication devices, among other examples. A control mode may include one or more of a connected mode (e.g., an RRC connected mode), an idle mode (e.g., an RRC idle mode), or an inactive mode (e.g., an RRC inactive mode). In the connected mode, the communication devices may have an active connection with one or more other communication devices (e.g., eNBs, gNBs). While in the connected mode, the communication devices may receive from or transmit to one or more other communication devices control or data information. In the idle mode, the communication devices may not have an active connection with one or more other communication devices (e.g., eNBs, gNBs). The communication devices may, however, be enabled to power on and establish an active connection. The inactive mode may provide benefits to the communication devices by reducing a duration to switch the communication devices to the connected mode, for example, from the idle mode. In other words, in the inactive mode, the communication devices may be awake and operate under a lower power mode compared to the connected mode, but under a higher power mode compared to the idle mode.

Various aspects of the present disclosure provide for data transmission with expiration time. In some examples, the communication devices may be configured to provide data transmission while remaining in the inactive mode (e.g., RRC inactive mode). For example, the communication devices may be configured to transmit data while remaining in the inactive mode without transitioning to the connected mode. In some cases, the communication devices may be configured to transmit one or more of uplink messages and downlink messages without transitioning to the connected mode. In some cases, the uplink messages may be an uplink transmission in an RRC message (e.g., a message 3 (msg3)). In such cases, downlink transmissions and subsequent uplink transmissions after the RRC message (such as the msg3) may be supported. However, in some cases, transmission of an uplink grant in a control message after the RRC message (such as the msg3) may be associated with a fixed dynamic grant timeline. Additionally, there may be an interval between two consecutive messages. Thus, it may be beneficial to have flexibility in the grant timeline for uplink packet transmission. Techniques described in the present disclosure provide for configuring an uplink grant associated with a duration (e.g., an expiration timer).

The communication devices may, in some examples, transmit a buffer status report to a network node (also referred to as a serving network node (e.g., an eNB, a gNB)). The buffer status report may be transmitted in an RRC message (e.g., the msg3). For example, a communication device may transmit, during a connection procedure (e.g., an RRC procedure, such as a cell acquisition procedure, a random access procedure, an RRC connection procedure, an RRC configuration procedure), a msg3 to the network node. The connection procedure may include establishing a connection between the communication device and the network node. Upon receiving the buffer status report, the network node may determine an uplink grant based on the buffer status report and a network configuration. The network node may transmit a control message while the communication devices are operating in a control mode (e.g., a connected mode, an inactive mode). For example, the communication devices may receive the control message while operating in an RRC inactive mode. In some cases, the control message may be encrypted based on a security key. Additionally, or alternatively, the control message may include the uplink grant associated with an expiration timer. In some cases, the allocated uplink grant resource may include a semi-persistent uplink resource with an expiration time, or a dedicated uplink resource with an expiration time, or a combination thereof. Upon receiving the control message, the communication devices may transmit to the network node, an uplink transmission in accordance with the uplink grant before the expiration timer lapses.

Aspects of the disclosure are initially described in the context of a wireless communications system. Aspects of the disclosure are further illustrated by and described with reference to apparatus diagrams, system diagrams, and flowcharts that relate to data transmission with expiration time.

FIG. 1 illustrates an example of a wireless communications system 100 that supports data transmission with expiration time in accordance with one or more aspects of the present disclosure. The wireless communications system 100 includes base stations 105 (e.g., gNodeBs (gNBs), or radio heads (RHs)), UEs 115, and a core network 130. In some examples, the wireless communications system 100 may be an LTE network, an LTE-A network, an LTE-A Pro network, or a NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 120 (e.g., via an S1, N2, N3, or other interface). Base stations 105 may communicate with one another over backhaul links 120 (e.g., via an X2, Xn, or other interface) either directly (e.g., directly between base stations 105) or indirectly (e.g., via core network 130). A UE 115 may communicate with the core network 130 through communication link 135.

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services 150 may include access to the Internet, Intranet(s), an IP Multimedia Subsystem (IMS), or a Packet-Switched (PS) Streaming Service.

At least some of the network devices, such as a base station 105, may include subcomponents such as an access network entity 140, which may be an example of an access node controller (ANC). Each access network entity 140 may communicate with UEs 115 through a number of other access network transmission entities 145, which may be referred to as a radio head, a smart radio head, or a transmission/reception point (TRP). In some configurations, various functions of each access network entity 140 or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying some amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or PDCP layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

One or more of the base stations 105 may include a communication manager 101, which may transmit a control message to the UEs 115, while the UEs 115 are in a control mode. In some cases, the control mode may be an RRC inactive mode. In some cases, the control message may be encrypted based on a security key. Additionally or alternatively, the control message may include an uplink grant associated with a duration, which may relate to a timer (e.g., an expiration timer). The communication manager 101 may then receive an uplink transmission in accordance with the uplink grant while the UEs 115 are in the control mode. In some cases, the uplink transmission may be based on the duration (e.g., the uplink transmission may occur before a timer lapses).

UEs 115 may include a communication manager 102, which may operate in a control mode. In some examples, the control mode may be an RRC inactive mode. The communication manager 102 may receive a control message encrypted with a security key from the communication manager 101. In some cases, the control message may include an uplink grant associated with a duration, which may relate to a timer (e.g., an expiration timer). The UEs 115 may transmit an uplink transmission in accordance with the uplink grant based on the duration (e.g., before the expiration timer lapses) while operating in the control mode.

Figure 2:
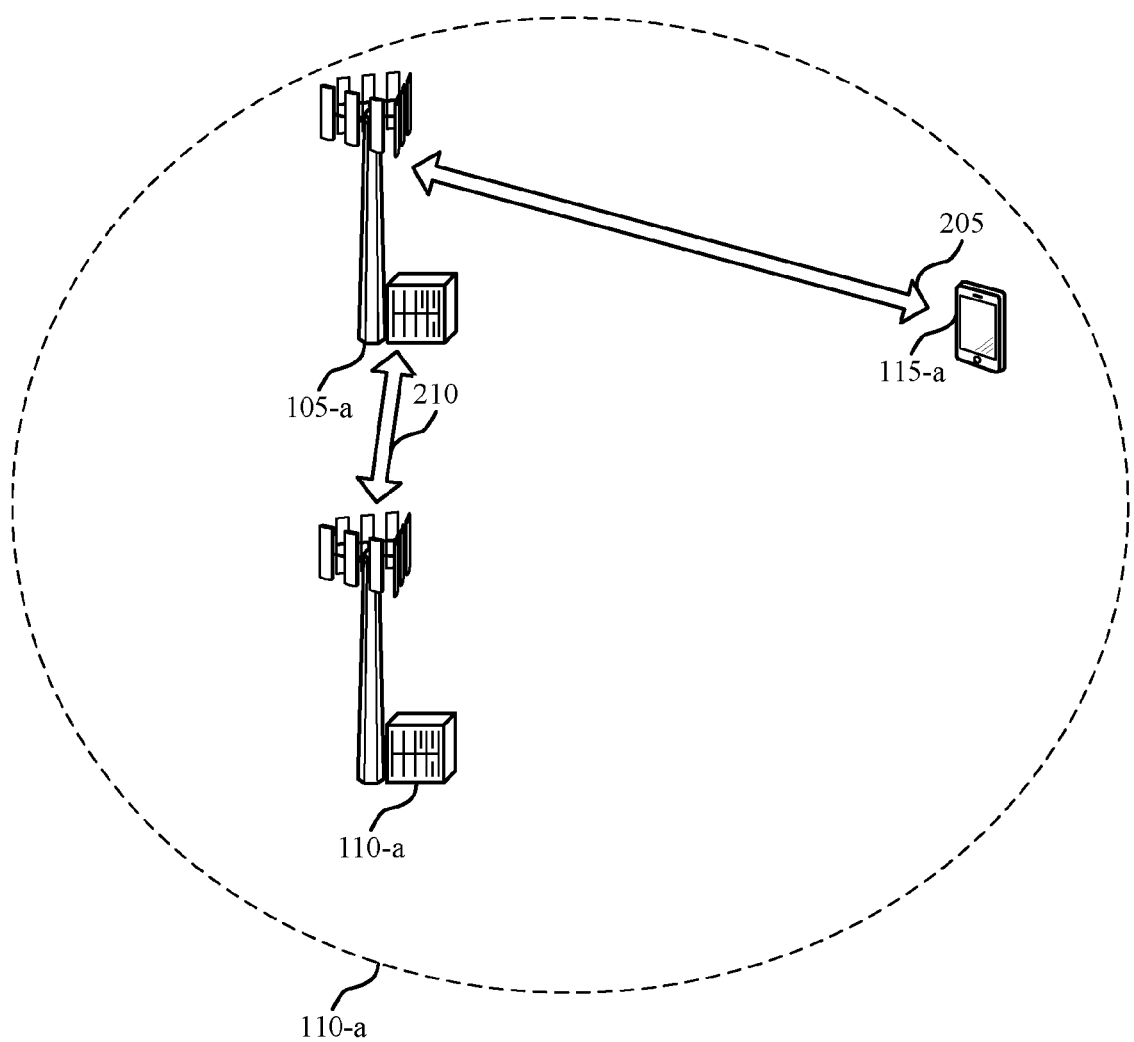

FIG. 2 illustrates an example of a wireless communications system 200 that supports data transmission with expiration time in accordance with one or more aspects of the present disclosure. In some examples, wireless communications system 200 may implement aspects of wireless communications system 100. In some examples, the wireless communications system 200 may include a serving network node 105-a, an anchor network node 110-a, and UE 115-a, which may be examples of the corresponding devices as described with reference to FIG. 1. The serving network node 105-a and the anchor network node 110-a may be examples of base station 105 described with reference to FIG. 1. The UE 115-a may communicate with the serving network node 105-a and the anchor network node 110-a within a geographical region 110-a. In some cases, the UE 115-a, the serving network node 105-a and the anchor network node 110-a may be associated with 5G system. For example, the UE 115-a, the serving network node 105-a and the anchor network node 110-a may be configured to communicate using technologies associated with 5G Radio Access Network (RAN).

In the example of FIG. 2, the wireless communications system 200 may support data transmission in an RRC inactive mode. For example, some wireless communications systems may support data transmission while remaining in an RRC inactive mode. Some wireless communications systems may support for techniques of transmitting a burst of data (or small data transmission) without transitioning to a connected mode. For example, a user plane data transmission may occur without transitioning the UE 115-a to an RRC connected mode. In some cases, direct downlink data transmission may also be possible without response to any uplink activity, while the UE remains in RRC inactive mode. In some cases, a first uplink transmission may be an uplink transmission in msg3 of an RRC connection. In such cases, downlink transmissions and subsequent uplink transmissions after msg3 may also be supported by the wireless communications system 200. Thus, the techniques described in FIG. 2 may aid in achieving low power consumption by allowing the UE 115-a to stay in RRC inactive mode without transition to RRC connected mode for data transmission. However, in some wireless communications systems, transmission of an uplink grant in an RRC message (such as a message 4 (msg4)) may be associated with a fixed dynamic grant timeline, and it may be beneficial to have flexibility in the grant timeline for uplink packet transmission.

The UE 115-*a* may be configured to communicate with the serving network node 105-*a* using two modes—Mobile Originated (MO) triggered access mode, and Mobile Terminated (MT) triggered access mode. In MO triggered access, the UE 115-*a* may be configured to transmit a subsequent uplink transmission after transmitting a first uplink transmission to a serving network node 105-*a*. In MT triggered access, the UE 115-*a* may be configured to receive a downlink transmission from a serving network node 105-*a*, and may transmit a subsequent uplink transmission after receiving the downlink transmission.

In some cases, the UE 115-*a* may have a connection 205 with the serving network node 105-*a*. The UE 115-*a* may transmit a buffer status report to the serving network node 105-*a*. Upon receiving the buffer status report, the serving network node 105-*a* may determine an uplink grant based on the buffer status report and a network configuration. The serving network node 105-*a* may then transmit a control message while the UE 115-*a* is in a control mode. In some cases, the control message may be encrypted based on a security key. Additionally or alternatively, may include the uplink grant associated with a duration, which may relate to a timer (e.g., an expiration timer). In some cases, the serving network node 105-*a* may receive the security key from anchor network node 110-*a* via connection 210. In some cases, the allocated uplink grant resource may include a semi-persistent uplink resource with an expiration time, or a dedicated uplink resource with an expiration time, or a combination. In some cases, where the communication between the UE 115-*a* and the serving network node 105-*a* s prior to anchor relocation, the serving network node 105-*a* may receive the security key from the anchor network node 110-*a*. Upon receiving the control message, the UE 115-*a* may transmit an uplink transmission in accordance with the uplink grant before the expiration timer lapses.

Figure 3:
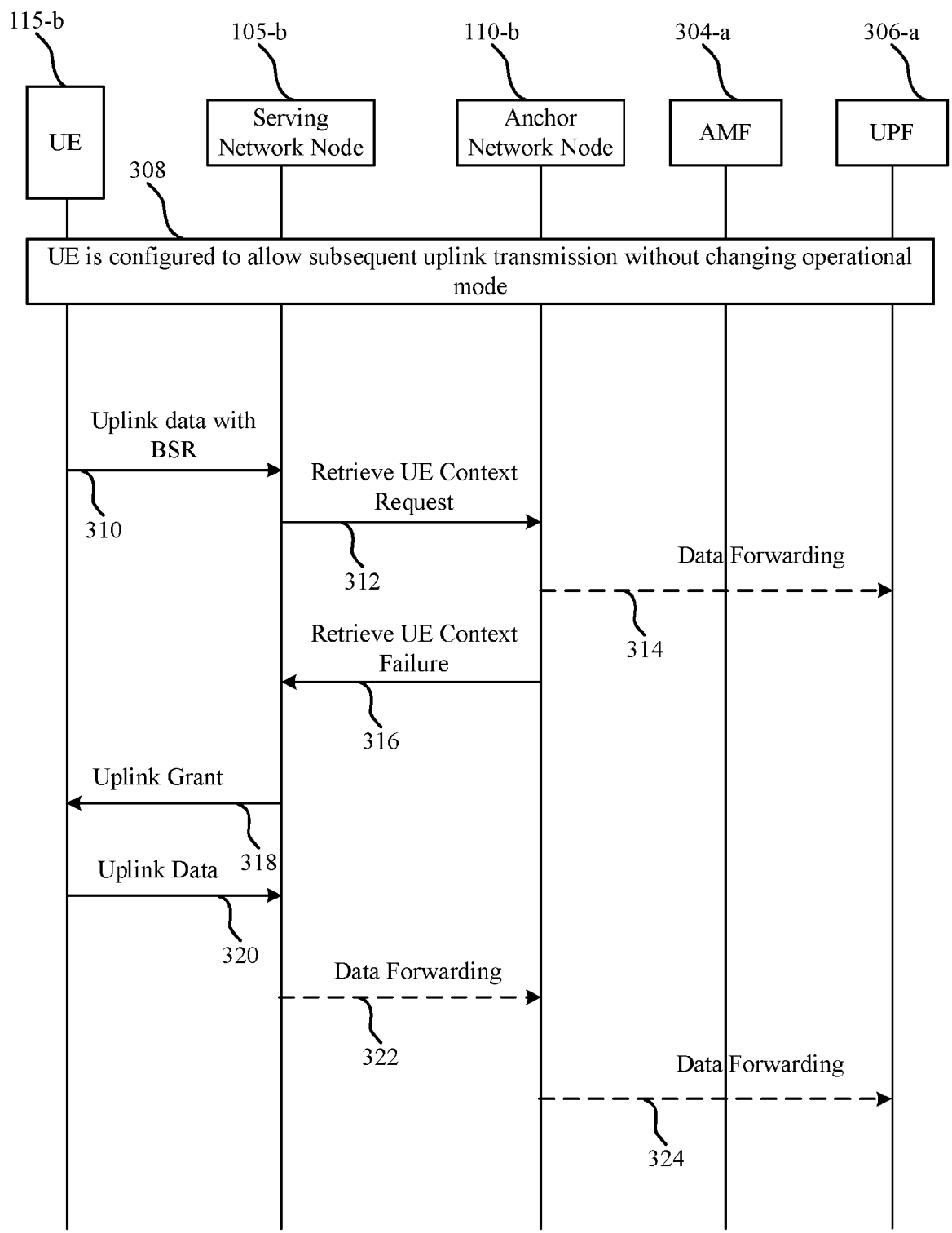
FIGS. 3 through 6 illustrate examples of process flows that support data transmission with expiration time in accordance with one or more aspects of the present disclosure.

FIG. 3 illustrates an example of a process flow 300 that supports data transmission with expiration time in accordance with one or more aspects of the present disclosure. In some examples, process flow 300 may implement aspects of wireless communications systems 100 and 200. Process flow 300 may include UE 115-*b*, serving network node 105-*b*, anchor network node 110-*b*, access and mobility management function (AMF) 304, and User Plane Function (UPF) 306. Process flow 300 may include UE 115-*b*, which may be an example of a UE 115 or UE 115-*a*, as described with reference to FIGS. 1 and 2. In some cases, UE 115-*b* may implement data transmission with expiration time. In the example of FIG. 3, the UE 115-*b*, the serving network node 105-*b*, the anchor network node 110-*b*, the digital signal processor (DSP), AMF 304, and the UPF 306 may be associated with a 5G system.

As previously discussed, current 5G NR systems supports small data transmission in an RRC inactive mode. For example, current 5G NR systems may support data transmission while remaining in RRC inactive mode. In the example of FIG. 3, a technique for a burst of data transmission (or small data transmission) is discussed. More specifically, the small data transmission may be a user plane data transmission and may occur without transitioning the UE 115-*b* to a connected mode. In some cases, the techniques described in FIG. 3 may achieve low power consumption by allowing the UE 115-*b* to stay in RRC inactive mode without transition to RRC connected mode for data transmission. In MO triggered access, the UE 115-*b* may be configured to transmit a subsequent uplink transmission after transmitting a first uplink transmission to a serving network node. For example, the first uplink transmission may be an uplink transmission in msg3 of an RRC connection. In some cases, the UE 115-*b* may have an uplink data size larger than a maximum data size of a system information broadcast transmission.

At 308, the UE 115-*b* may be configured to allow subsequent uplink transmission without changing operational mode. In some cases, the UE 115-*b* may operate in a control mode. In some cases, the control mode may be an RRC mode. As one example, the RRC mode may be an RRC inactive mode. At 310, the UE 115-*b* may be configured to transmit an uplink transmission (such as, msg3) including a buffer status report. The UE 115-*b* may be configured to transmit the uplink transmission to the serving network node 105-*b*. In some cases, the uplink transmission may be routed to the 5G core network (not shown).

In some examples, prior to anchor relocation, the uplink data may be forwarded to the anchor network node 110-*b*, and the anchor network node 110-*b* may then route the uplink transmission to the 5G core network. However, in cases after anchor relocation, uplink data may be forwarded to the serving network node 105-*b*, and the serving network node 105-*b* may route the uplink transmission to the 5G core network. In an alternative example, the uplink data including the buffer status report and a subsequent uplink data may be routed to the 5G core network via the serving network node 105-*b* after anchor relocation to the serving network node 105-*b*. Additionally or alternatively, both of the uplink data including the buffer status report and a subsequent uplink data may be routed to the 5G core network via the anchor network node 110-*b* without anchor relocation (as shown in FIG. 3).

At 312, upon receiving the uplink transmission (such as, msg3) including the buffer status report, the serving network node 105-*b* may transmit a request to retrieve a context associated with the UE 115-*b*. For example, the serving network node 105-*b* may transmit the request to the anchor network node 110-*b*. In some cases, the serving network node 105-*b* may additionally transmit the uplink data received at 310, to the anchor network node 110-*b*. In some cases, the request to retrieve the context associated with the UE 115-*b*, may include a PDCP PDU associated with a logical channel identifier, an indication of a subsequent uplink transmission, or a combination.

In some cases, the serving network node 105-*b* may include a flag in the request to retrieve the context associated with the UE 115-*b*. In some cases, the flag may be set to remain "on" to indicate a subsequent uplink transmission to the anchor network node 110-*b*. In some cases, the flag included in the request may indicate to the anchor network node 110-*b*, that the subsequent uplink data will be deciphered by the anchor network node 110-*b* with a predetermined security key. In some cases, the predetermined security key may be the same security key as a prior message.

At 314, the uplink data received at 310 (such as uplink data received in msg3) may be subsequently routed to 5G core network (such as AMF 304 and UPF 406) along with the request to retrieve the context associated with the UE 115-*b*. For example, the anchor network node 110-*b* may be configured to forward the uplink transmission (such as, msg3) including the buffer status report and the request to retrieve the context associated with the UE 115-*b* to the UPF 306 (or one or more portions of the 5G core network).

At 316, the serving network node 105-*b* may receive a response indicating a failure to retrieve the context associated with the UE 115-*b*. In some cases, the serving network node 105-*b* may receive the response from the anchor network node 110-*b*. In some cases, the response indicating the failure to retrieve the context associated with the UE 115-*b* may include at least one of an RRC container, a downlink PDCP PDU associated with a logical channel identifier, or a combination. In some cases, the serving network node 105-*b* may be configured to transmit a control message to the UE-115-*b* based on the received response.

At 318, the serving network node 105-*b* may transmit a control message to the UE 115-*b* while the UE 115-*b* is in a control mode. For example, the serving network node 105-*b* may transmit the control message while the UE 115-*b* is in an RRC inactive mode. In some cases, the control message may be encrypted based on a security key. Additionally or alternatively, the control message may include an uplink grant associated with a duration (e.g., an expiration timer). As previously discussed, the serving network node 105-*b* may be configured to transmit the control message to the UE-115-*b* based on receiving the response indicating the failure to retrieve the context, at 316.

In some cases, the serving network node 105-*b* transmits the uplink grant for subsequent uplink transmission to the UE 115-*b*, together with an RRC release message including a suspend configuration (such as "suspendConfig"). In some cases, the RRC release message including the suspend configuration may indicate the UE 115-*b* to remain in an RRC inactive mode during the subsequent uplink transmission. In some examples, the uplink grant associated with the duration (e.g., expiration timer) may include at least one of a semi-persistent uplink resource with the duration (e.g., expiration timer), a dedicated uplink resource with the expiration timer, or a combination thereof.

At 320, the UE 115-*b* may transmit, to the serving network node 105-*b*, an uplink transmission in accordance with the uplink grant based on the duration (e.g., before an expiration timer lapses). In some cases, the UE 115-*b* may transmit the uplink transmission (such as RRC inactive mode) while operating in the control mode. In some cases, the uplink grant may be based on the buffer status report, a network configuration, or a combination. In some cases, the uplink transmission may be security protected with the same key as the uplink grant received at 318.

In some cases, the UE 115-*b* may determine the security key shared between the UE 115-*b* and the serving network node 105-*b* is based on the control message received in 318, and may then encrypt the uplink transmission using the security key shared between the UE 115-*b* and the serving network node 105-*b*. In some cases, the UE 115-*b* may be configured to multiplex the uplink transmission with a second control message that includes an indication for the UE 115-*b* to remain in the control mode. The UE 115-*b* may then transmit the multiplexed uplink transmission in accordance with the uplink grant, to the serving network node 105-*b*. In one example, the second control message may be an RRCReleaseComplete message. In some cases, the data size of the uplink transmission may be greater than a data size of a system information broadcast transmission. At 322, the serving network node 105-*b* may forward the uplink transmission to the anchor network node 110-*b*. At 324, the anchor network node 110-*b* may forward the uplink transmission to the one or more components of the 5G core network (such as the UPF 306).

Figure 4:
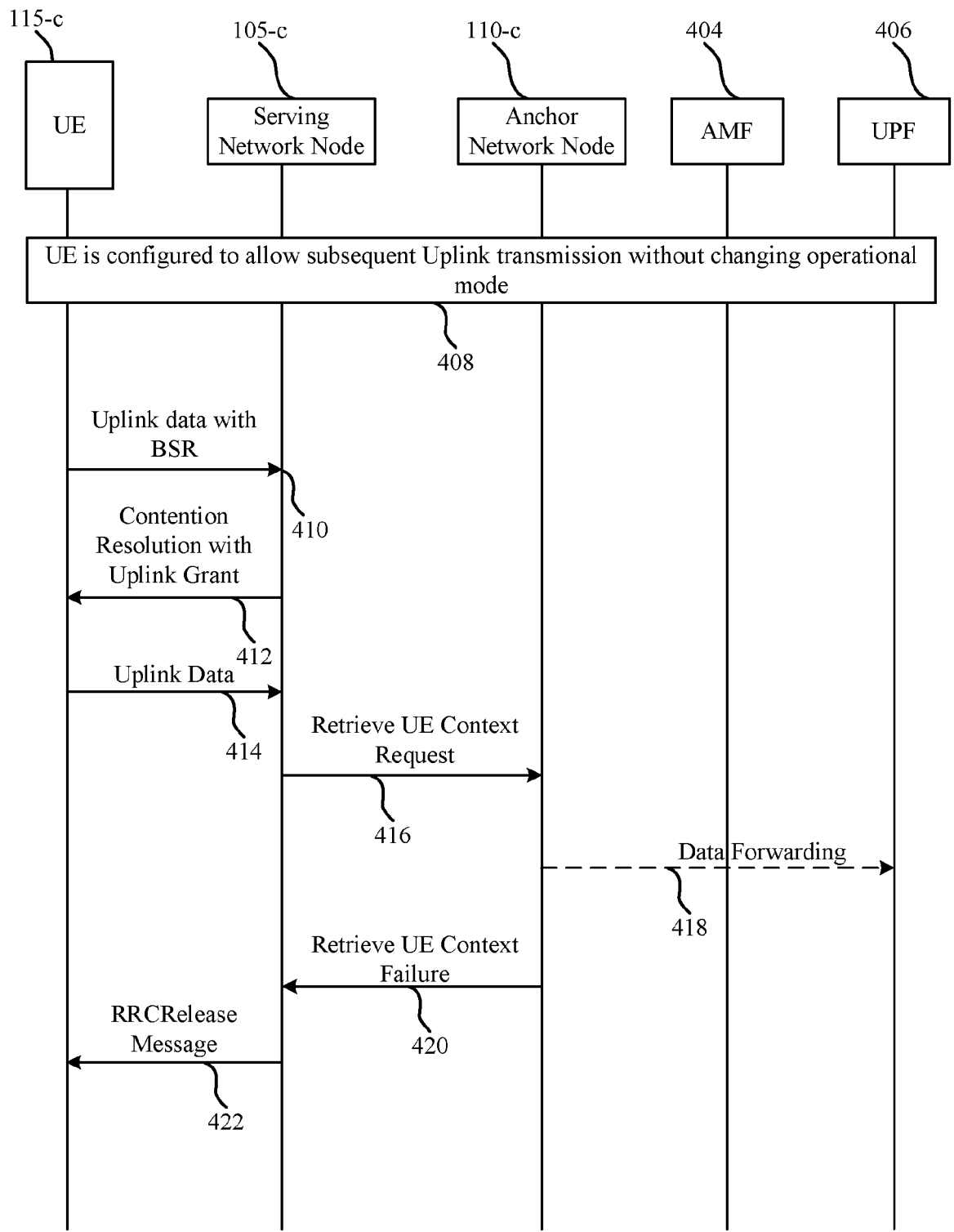

FIG. 4 illustrates an example of a process flow 400 that supports data transmission with expiration time in accordance with one or more aspects of the present disclosure. In some examples, process flow 400 may implement aspects of wireless communications systems 100 and 200. Process flow 400 may include UE 115-*c*, serving network node 105-*c*, anchor network node 110-*c*, AMF 404, and UPF 406.

Process flow 400 may include UE 115-*c*, which may be an example of a UE 115, UE 115-*a*, or UE 115-*b*, as described with reference to FIGS. 1, 2 and 3. In some cases, UE 115-*c* may implement data transmission with expiration time. In the example of FIG. 4, the UE 115-*c*, the serving network node 105-*c*, the anchor network node 110-*c*, the AMF 404, and the UPF 406 may be associated with a 5G system.

Some wireless communications systems may support small data transmission in an inactive RRC mode. In some examples, current 5G NR systems may support data transmission while remaining in RRC inactive mode. However, in some wireless communications systems, transmission of an uplink grant in an RRC message (such as msg4) may be associated with a fixed dynamic grant timeline. In some cases, there may be a relatively long interval between the uplink grant (such as in msg4) and subsequent uplink transmission (such as an uplink transmission packet in Message5). It may be beneficial to have flexibility in the grant timeline for uplink packet transmission (such as uplink packet transmission in Message.5). In some cases, based on a network configuration and receiving a buffer status report from a UE (such as UE 115-*c*), the serving network node 105-*c* may transmit an uplink grant in an RRC message. In some cases, the serving network node 105-*c* may transmit an RRC release with a suspend configuration to configure the UE 150-*c* to remain in RRC inactive mode for a subsequent uplink transmission (such as an uplink transmission in Message 5). In some cases, the allocated uplink grant resource includes a semi-persistent uplink resource with an expiration time, or a dedicated uplink resource with an expiration time, or a combination.

At 408, the UE 115-*c* may be configured to allow subsequent uplink transmission without changing operational mode. In some cases, the UE 115-*c* may operate in an RRC mode. As one example, the RRC mode may be an RRC inactive mode.

At 410, the UE 115-*c* may be configured to transmit an uplink transmission (such as, msg3) including a buffer status report. The UE 115-*c* may be configured to transmit the uplink transmission to the serving network node 105-*c*. In some cases, the uplink transmission may be routed to one or more components of the 5G core network (such as AMF 404 and UPF 406). In some cases, the UE 115-*c* may be configured to include one or more uplink RLC PDU segments in the uplink transmission. The serving network mode 105-*c* may receive the uplink transmission including the buffer status report and the one or more uplink RLC PDU segments. The serving network node 105-*c* may then assemble the RLC PDU segments based on the received uplink transmission, and may transmit the assembled RLC PDU segments to the anchor network node 110-*c*.

At 412, upon receiving the uplink transmission (such as, msg3) including the buffer status report and the one or more uplink RLC PDU segments, the serving network node 105-*c* may determine an uplink grant to be included in a control message. In one example, the serving network node 105-*c* may determine the uplink grant based on the buffer status report, the one or more uplink RLC PDU segments, or a combination thereof. Upon determining the uplink grant, the serving network node 105-*c* may transmit the control message to the UE 115-*c* while the UE 115-*c* is in a control mode. For example, the serving network node 105-*c* may transmit the control message while the UE 115-*c* is in an RRC inactive mode. In the example of FIG. 4, the control message may include a contention resolution message and the determined uplink grant. In some examples, the determined uplink grant may include at least one of a semi-persistent uplink resource with the expiration timer, a dedicated uplink resource with the expiration timer, or a combination thereof. In some cases, the serving network node 105-c may determine the security key shared between the UE 115-c and the serving network node 105-c. The serving network node 105-c may then indicate the security key shared between the UE and the serving network node using the control message at 412. In some cases, the control message may be encrypted based on the security key.

At 414, the UE 115-c may transmit, to the serving network node 105-c, an uplink transmission in accordance with the uplink grant before the expiration timer lapses. In some cases, the UE 115-c may transmit the uplink transmission while operating in an RRC inactive mode. In some cases, the uplink transmission may be security protected with the same key as the received uplink grant. In some cases, the UE 115-c may determine the security key indicated in the control message, and may encrypt the uplink transmission using the security key shared between the UE 115-c and the serving network node 105-c.

At 416, the serving network node 105-c may transmit a request to retrieve a context associated with the UE 115-c. In some cases, the serving network node 105-c may transmit the request to the anchor network node 110-c. In some cases, the serving network node 105-c may transmit the uplink data received at 412. In some cases, the request to retrieve the context associated with the UE 115-c, may include a PDCP PDU associated with a logical channel identifier.

At 418, the anchor network node 110-c may route the uplink data received at 412 (such as uplink data received in Message 5) to AMF 404 and UPF 406 along with the request to retrieve the context associated with the UE 115-c. For example, the anchor network node 110-c may be configured to forward the uplink transmission (such as, Message 5) and the request to retrieve the context associated with the UE 115-c to the UPF 406 (or one or more portions of the 5G core network).

At 420, the serving network node 105-c may receive a response indicating a failure to retrieve the context associated with the UE 115-c. In some cases, the serving network node 105-c may receive the response from the anchor network node 110-c. In some cases, the response indicating the failure to retrieve the context associated with the UE 115-c may include at least one of an RRC container, a downlink PDCP PDU associated with a logical channel identifier, or a combination. At 422, the serving network node 105-c may be configured to transmit the RRC release message including a suspend configuration (such as "suspendConfig").

Figure 5:
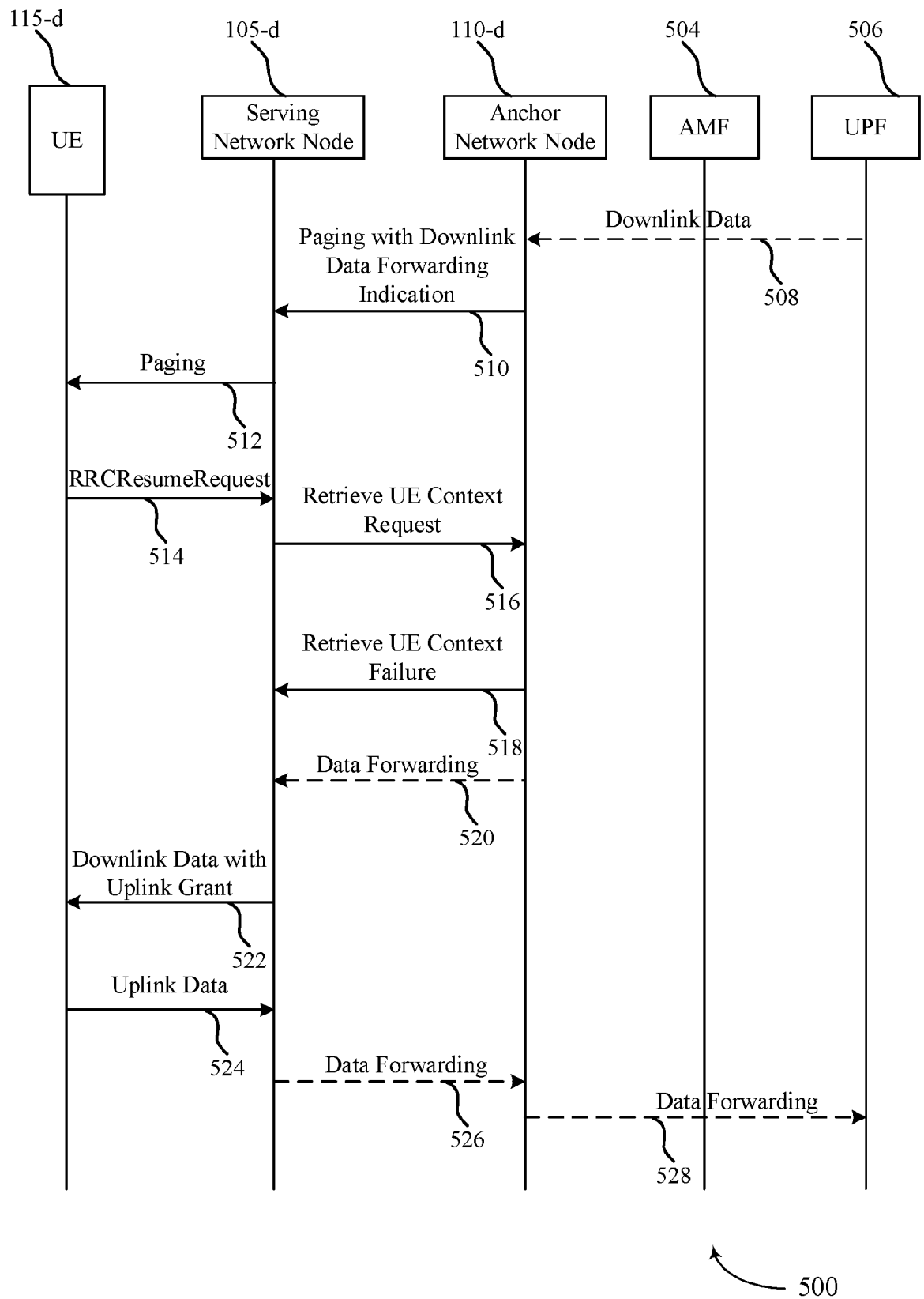

FIG. 5 illustrates an example of a process flow 500 that supports data transmission with expiration time in accordance with one or more aspects of the present disclosure. In some examples, process flow 500 may implement aspects of wireless communications systems 100 and 200. Process flow 500 may include UE 115-d, serving network node 105-d, anchor network node 110-d, AMF 504, and UPF 506. Process flow 500 may include UE 115-d, which may be an example of a UE 115, UE 115-a, UE 115-b, or UE 115-c, as described with reference to FIGS. 1, 2, 3 and 4. In some cases, UE 115-d may implement data transmission with expiration time. In the example of FIG. 3, the UE 115-d, the serving network node 105-d, the anchor network node 110-d, the AMF 504, and the UPF 506 may be associated with a 5G system. Specifically, the example of FIG. 5 describes data transmission with expiration timer in cases without anchor relocation.

The example of FIG. 5 relates to data transmission with expiration time in MT triggered access. In MT triggered access, the UE 115-d may be configured to receive a downlink transmission from a serving network node 105-d and may transmit a subsequent uplink transmission after receiving the downlink transmission. In some cases, the subsequent uplink transmission may include an uplink TCP acknowledgement message. In some examples, the downlink transmission may be a transmission in msg4 of an RRC connection and the subsequent uplink transmission may be a transmission in Message 5 of the RRC connection. For both MO triggered access (such as examples of FIGS. 3 and 4) and MT triggered access (such as example of FIG. 5), it may be beneficial for the UE 115-d to remain in RRC inactive mode without having the UE 115-d move to RRC connected mode. This allows the UE 115-d to transmit subsequent uplink data in Message 5, while remaining in RRC inactive mode.

At 508, the anchor network node 110-d may receive a downlink data from the 5G core network. In some cases, the anchor network node 110-d may receive the downlink data from the UPF 506. In some cases, the downlink data may be configured to trigger a RAN paging procedure. At 510, the anchor network node 110-d may transmit a paging message to the serving network node 105-d. In some cases, the paging message may include a downlink data forwarding indication. In some cases, the serving network node 105-d may receive the paging message from the anchor network node 105-d and may initiate a paging procedure with the UE 115-d. Upon receiving the paging message including the downlink data forwarding indication, at 512, the serving network node 105-d may transmit a paging message to the UE 115-d. At 514, the serving network node 105-d may receive a second control message in response to the paging message. In some cases, the second control message may include a resume request message. For example, the second control message may include an RRCResumeRequest message. In some cases, the UE 115-d may be operating in a control mode. As one example, the control mode may be an RRC inactive mode.

At 516, upon receiving the second control message in response to the paging message, the serving network node 105-d may transmit a request to retrieve a context associated with the UE 115-d. For example, the serving network node 105-d may transmit the request to the anchor network node 110-d. In some cases, the request to retrieve the context associated with the UE 115-d may include a downlink forwarding tunneling information.

At 518, the serving network node 105-d may receive a response indicating a failure to retrieve the context associated with the UE 115-d. In some case, the serving network node 105-d may receive the response from the anchor network node 110-d. In some examples, the response indicating the failure to retrieve the context associated with the UE 115-d may include at least one of an RRC container with an uplink transmission flag. In some cases, the flag may be set to remain "on" to configure the serving network node 105-d to generate an uplink grant. At 520, the serving network node 105-d may receive a downlink data from the anchor network node 110-d.

At 522, the serving network node 105-d may transmit a control message to the UE 115-d while the UE 115-d is in a control mode. For example, the serving network node 105-d may transmit the control message while the UE 115-d is in an RRC inactive mode. In some cases, the control message may be encrypted based on a security key. Additionally or alternatively, the control message may include an uplink grant associated with a duration (e.g., an expiration timer). As previously discussed, the serving network node 105-*d* may be configured to transmit the control message to the UE-115-*d* based on receiving the response indicating the failure to retrieve the context, at 518. In some examples, the uplink grant associated with the expiration timer may include at least one of a semi-persistent uplink resource with the expiration timer, a dedicated uplink resource with the expiration timer, or a combination thereof.

At 524, the UE 115-*d* may transmit an uplink transmission to the serving network node 105-*d*. In some cases, the uplink transmission may be in accordance with the uplink grant, and the uplink transmission may be transmitted before the expiration timer lapses. In some cases, the UE 115-*d* may transmit the uplink transmission (such as RRC inactive mode) while operating in the control mode. In some cases, the uplink transmission may be security protected with the same key as the uplink grant received at 522. In some cases, the uplink transmission may be a user plane data transmission. In some cases, the uplink transmission may include a control message multiplexed with the uplink data. In some examples, the control message may include an RRCRelease-Complete message. At 526, the serving network node 105-*d* may forward the uplink transmission to the anchor network node 110-*d*. At 528, the anchor network node 110-*d* may forward the uplink transmission to the one or more components of the 5G core network (such as the UPF 506).

Figure 6:
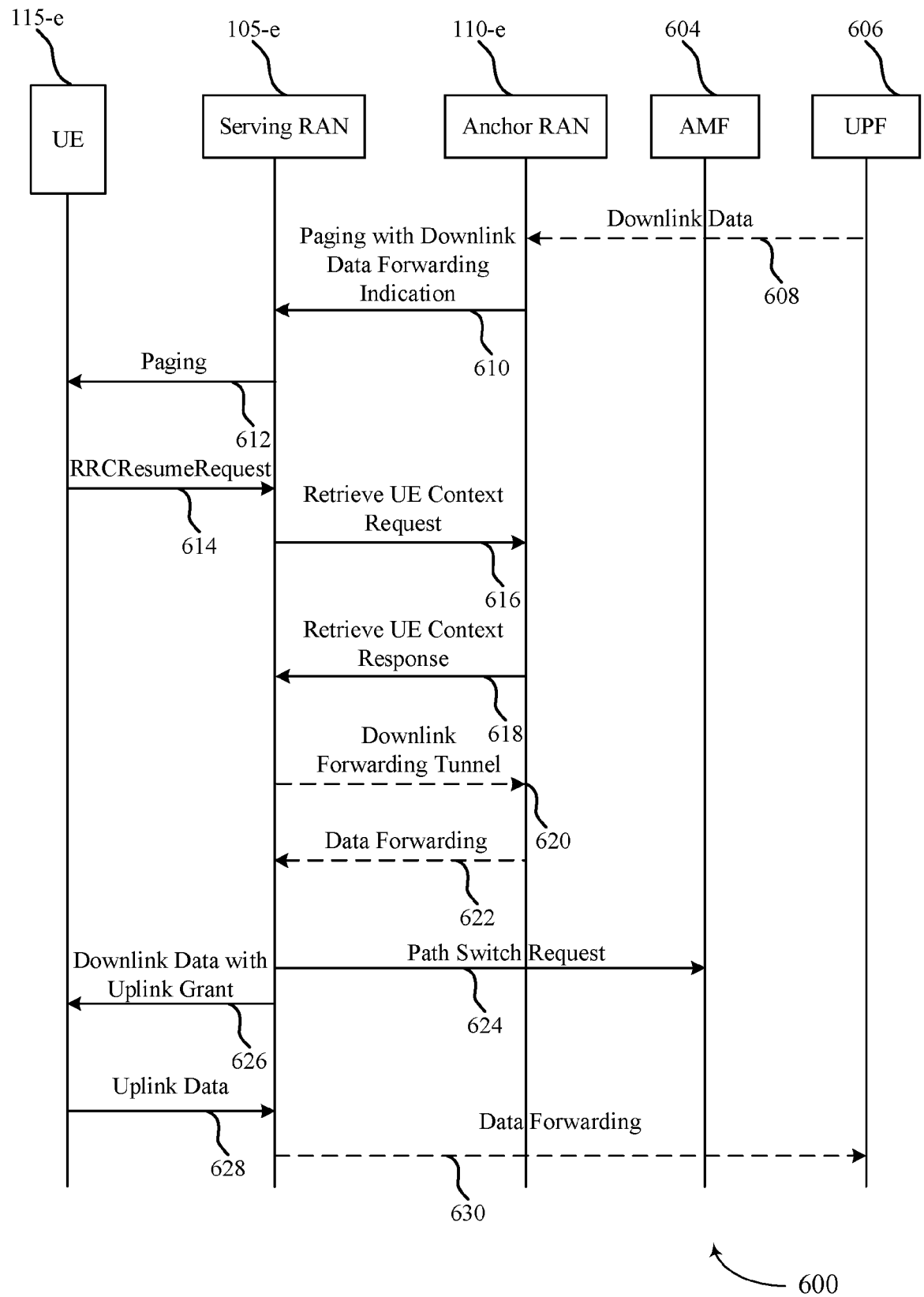

FIG. 6 illustrates an example of a process flow 600 that supports data transmission with expiration time in accordance with one or more aspects of the present disclosure. In some examples, process flow 600 may implement aspects of wireless communications systems 100 and 200. Process flow 600 may include UE 115-*e*, serving network node 105-*e*, anchor network node 110-*e*, AMF 604, and UPF 606. Process flow 600 may include UE 115-*e*, which may be an example of a UE 115, UE 115-*a*, UE 115-*b*, UE 115-*c* or UE 115-*d*, as described with reference to FIGS. 1, 2, 3, 4 and 5. In some cases, UE 115-*e* may implement data transmission with expiration time. In the example of FIG. 3, the UE 115-*e*, the serving network node 105-*e*, the anchor network node 110-*e*, the AMF 604, and the UPF 606 may be associated with a 5G system. Specifically, the example of FIG. 6 describes data transmission with expiration timer in cases with anchor relocation.

The example of FIG. 6 relates to data transmission with expiration time in MT triggered access. As previously discussed with reference to FIG. 5, in MT triggered access, the UE 115-*e* may be configured to receive a downlink transmission from a serving network node 105-*e* and may transmit a subsequent uplink transmission after receiving the downlink transmission. In some cases, the subsequent uplink transmission may be performed according to an uplink grant. The uplink grant may be associated with a duration (e.g., an expiration timer). In such MT triggered access, it may be beneficial for the UE 115-*e* to remain in RRC inactive mode while transmitting the uplink transmission within the expiration timer.

At 608, the anchor network node 110-*e* may receive a downlink data from the 5G core network. As described in FIG. 6, the anchor network node 110-*e* may receive the downlink data from the UPF 606. The receipt of the downlink data may trigger a RAN paging procedure. At 610, the anchor network node 110-*e* may transmit a paging message to the serving network node 105-*e*, using methods described in FIG. 5. In some cases, the paging message may include a downlink data forwarding indication. Upon receiving the paging message, at 612, the serving network node 105-*e* may initiate a paging procedure with the UE 115-*e*. As part of the paging procedure, the serving network node 105-*e* may transmit a paging message to the UE 115-*e*.

At 614, the serving network node 105-*e* may receive a resume request message in response to the paging message. For example, the serving network node 105-*e* may receive an RRCResumeRequest message. At 616, the serving network node 105-*e* may transmit a request to retrieve a context associated with the UE 115-*e*. The serving network node 105-*e* transmits the request to retrieve the context associated with the UE 115-*e* to the anchor network node 110-*e*. In some cases, the request may include a downlink forwarding tunneling information.

At 618, the serving network node 105-*e* may receive a response indicating the context associated with the UE 115-*e*. In some case, the serving network node 105-*e* may receive the response from the anchor network node 110-*e*. At 620, the serving network node 105-*e* may transmit a downlink forwarding tunneling information to the anchor network node 110-*e*. In some cases, the serving network node 105-*e* may transmit a request for anchor relocation to the anchor network node 110-*e*. In some cases, the request for anchor relocation may include the downlink forwarding tunneling information.

At 622, the serving network node 105-*e* may receive data forwarded by the anchor network node 110-*e*. In some cases, the forwarded data may include a response confirming the request for anchor relocation. Upon receiving the response confirming the request for anchor relocation, at 624, the serving network node 105-*e* may transmit a path switch request to the AMF 604. In some cases, the path switch request may include a request for a security key. The serving network node 105-*e* may receive the security key from the AMF 604 (not shown).

At 626, the serving network node 105-*e* may transmit a control message to the UE 115-*e* while the UE 115-*e* is in a control mode. In some cases, the control message may be security protected using the security key received by the serving network node 105-*e*. In some cases, the serving network node 105-*e* may transmit the control message while the UE 115-*e* is in an RRC inactive mode. In some cases, the control message may include an uplink grant associated with an expiration timer.

At 628, the UE 115-*e* may transmit an uplink transmission to the serving network node 105-*e* in accordance with the received uplink grant. In some cases, the uplink transmission may be transmitted before the expiration timer lapses. In some cases, the uplink transmission may be a user plane data transmission. In some cases, the uplink transmission may include a control message multiplexed with the uplink data. In some examples, the control message may include an RRCReleaseComplete message. At 630, the serving network node 105-*e* may forward the uplink transmission to the one or more components of the 5G core network (such as the UPF 606).

Figure 7:
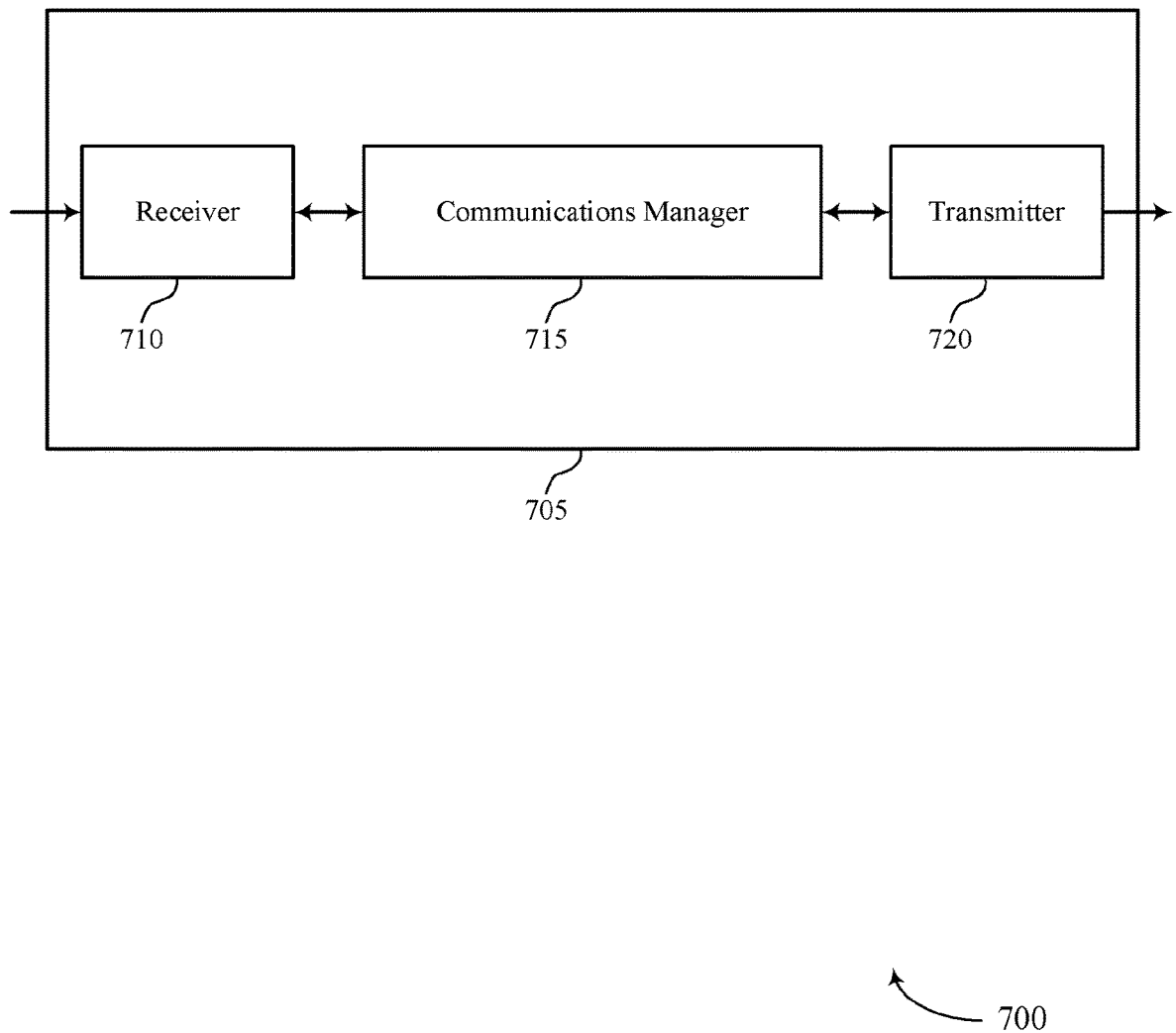
FIGS. 7 and 8 show block diagrams of devices that support data transmission with expiration time in accordance with one or more aspects of the present disclosure.

FIG. 7 shows a block diagram 700 of a device 705 that supports data transmission with expiration time in accordance with one or more aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to data transmission with expiration time, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may operate in a control mode, receive, from a network node, a control message including an uplink grant associated with a duration (e.g., an expiration timer). The communications manager 715 may transmit, to the network node, an uplink transmission in accordance with the uplink grant and the duration (e.g., before the expiration timer lapses) while operating in the control mode. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a DSP, an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
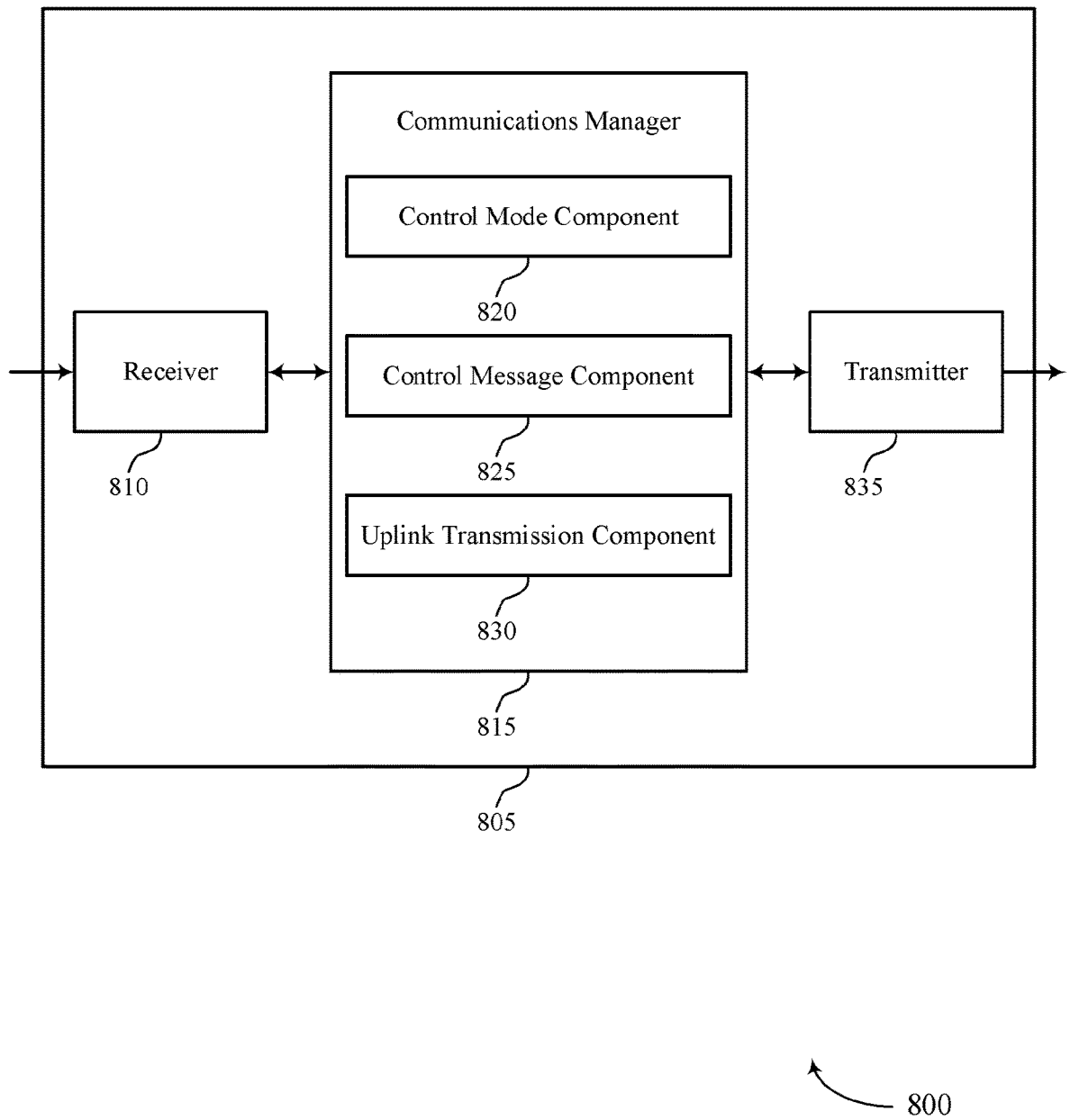

FIG. 8 shows a block diagram 800 of a device 805 that supports data transmission with expiration time in accordance with one or more aspects of the present disclosure. The device 805 may be an example of aspects of a device 705, or a UE 115 as described herein. The device 805 may include a receiver 810, a communications manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to data transmission with expiration time, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a control mode component 820, a control message component 825, and an uplink transmission component 830. The communications manager 815 may be an example of aspects of the communications manager 1010 described herein.

The control mode component 820 may enable the device 805 to operate in a control mode. The control message component 825 may receive, from a network node, a control message including an uplink grant associated with a duration (e.g., an expiration timer). The uplink transmission component 830 may transmit, to the network node, an uplink transmission in accordance with the uplink grant and the duration (e.g., before the expiration timer lapses) while operating in the control mode.

The transmitter 835 may transmit signals generated by other components of the device 805. In some examples, the transmitter 835 may be collocated with a receiver 810 in a transceiver module. For example, the transmitter 835 may be an example of aspects of the transceiver 1020 described with reference to FIG. 10. The transmitter 835 may utilize a single antenna or a set of antennas.

Figure 9:
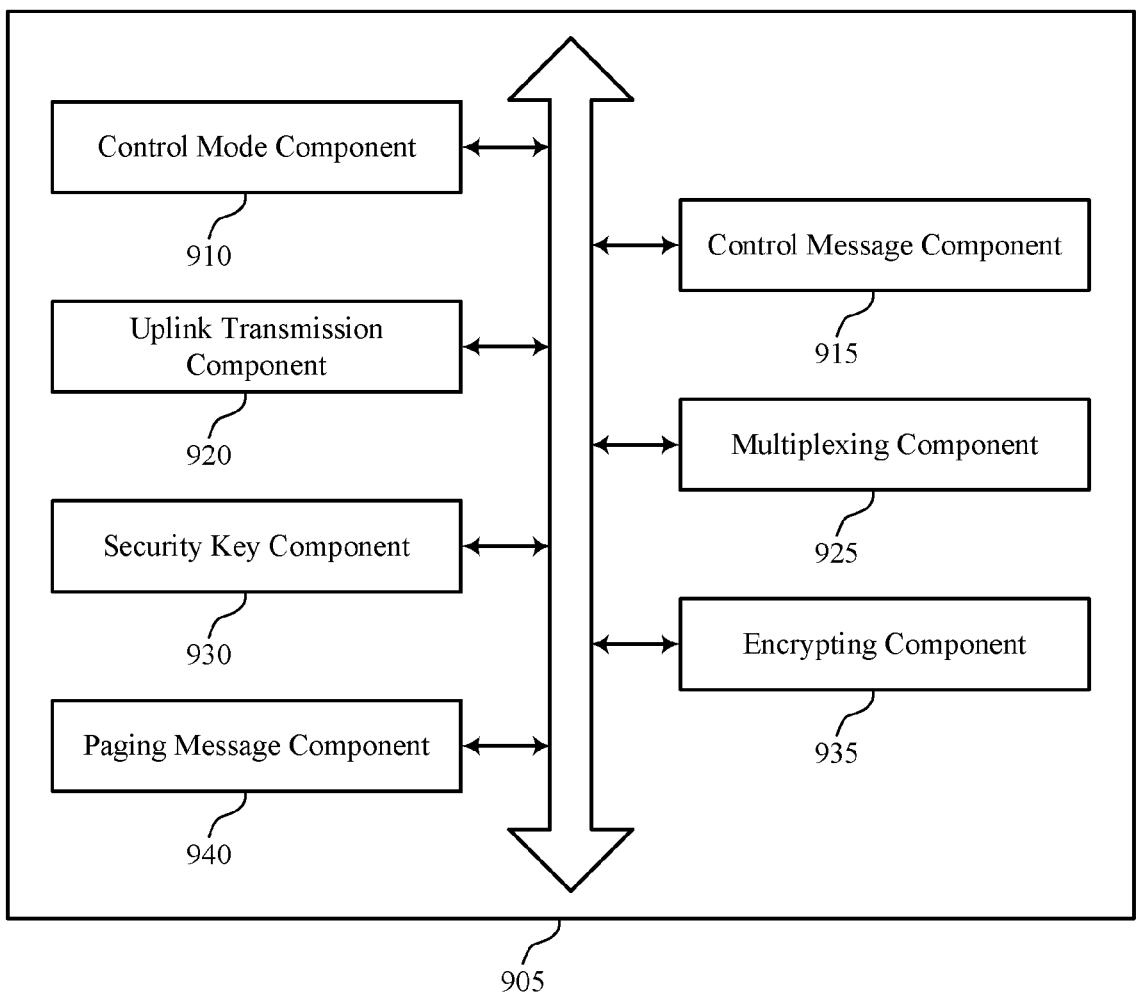
FIG. 9 shows a block diagram of a communications manager that supports data transmission with expiration time in accordance with one or more aspects of the present disclosure.

FIG. 9 shows a block diagram 900 of a communications manager 905 that supports data transmission with expiration time in accordance with one or more aspects of the present disclosure. The communications manager 905 may be an example of aspects of a communications manager 715, a communications manager 815, or a communications manager 1010 described herein. The communications manager 905 may include a control mode component 910, a control message component 915, an uplink transmission component 920, a multiplexing component 925, a security key component 930, an encrypting component 935, and a paging message component 940. Each of these modules may communicate, directly or indirectly, with one another (e.g., via one or more buses).

The control mode component 910 may enable the device to operate in a control mode. In some cases, the control mode includes an RRC inactive mode. The control message component 915 may receive, from a network node, a control message including an uplink grant associated with a duration. The control message may be encrypted based on a security key. In some examples, the duration may relate to an expiration timer. In some examples, the control message component 915 may receive, from the network node, the control message based on the buffer status report, the one or more uplink RLC PDU segments, or a combination thereof, the control message including a contention resolution message and the uplink grant associated with the duration. In some examples, the control message component 915 may transmit a second control message in response to the paging message, the second control message including a resume request message. In some cases, the uplink grant associated with the duration includes at least one of a semi-persistent uplink resource with the duration, a dedicated uplink resource with the duration, or a combination thereof.

The uplink transmission component 920 may transmit, to the network node, an uplink transmission in accordance with the uplink grant and the duration while operating in the control mode. In some examples, the duration relates to an expiration timer. The uplink transmission component 920 may transmit, to the network node, the uplink transmission in accordance with the uplink grant before the expiration timer lapses. In some examples, the uplink transmission component 920 may transmit, to the network node, the multiplexed uplink transmission in accordance with the uplink grant. In some examples, the uplink transmission component 920 may transmit, to the network node, a second uplink transmission including a buffer status report, where the second uplink transmission occurs before the uplink transmission. In some examples, the uplink transmission component 920 may transmit, to the network node, a second uplink transmission including a buffer status report, one or more uplink RLC PDU segments, or a combination thereof, where the second uplink transmission occurs before the uplink transmission. In some cases, the uplink grant is based on the buffer status report, a network configuration, or a combination thereof. In some cases, a data size of the uplink transmission is greater than a data size of a system information broadcast transmission.

The multiplexing component 925 may multiplex the uplink transmission with a second control message that includes an indication for the UE to remain in the control mode. In some cases, the second control message includes a release message. The security key component 930 may determine the security key shared between the UE and the network node is based on the control message. The encrypting component 935 may encrypt the uplink transmission using the security key shared between the UE and the network node. The paging message component 940 may receive, from the network node, a paging message prior to receiving the control message, the paging message including a downlink data forwarding indication.

Figure 10:
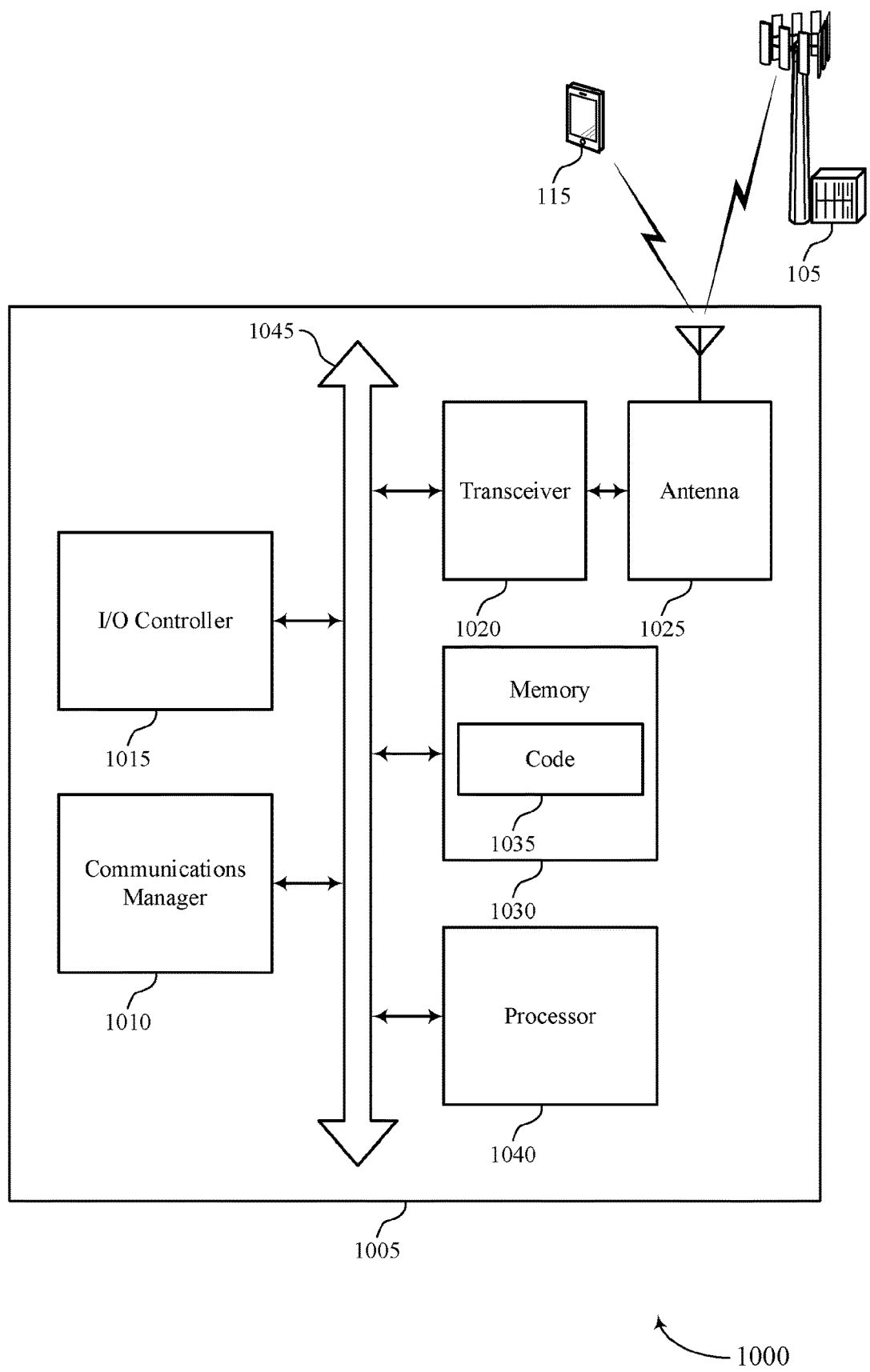
FIG. 10 shows a diagram of a system including a device that supports data transmission with expiration time in accordance with one or more aspects of the present disclosure.

FIG. 10 shows a diagram of a system 1000 including a device 1005 that supports data transmission with expiration time in accordance with one or more aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may operate in a control mode, receive, from a network node, a control message including an uplink grant associated with a duration (e.g., an expiration timer), and transmit, to the network node, an uplink transmission in accordance with the uplink grant and the duration (e.g., before the expiration timer lapses) while operating in the control mode.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described herein. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas. In some cases, the device 1005 may include a single antenna 1025. However, in some cases the device 1005 may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic input/output system (BIOS) which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting data transmission with expiration time).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
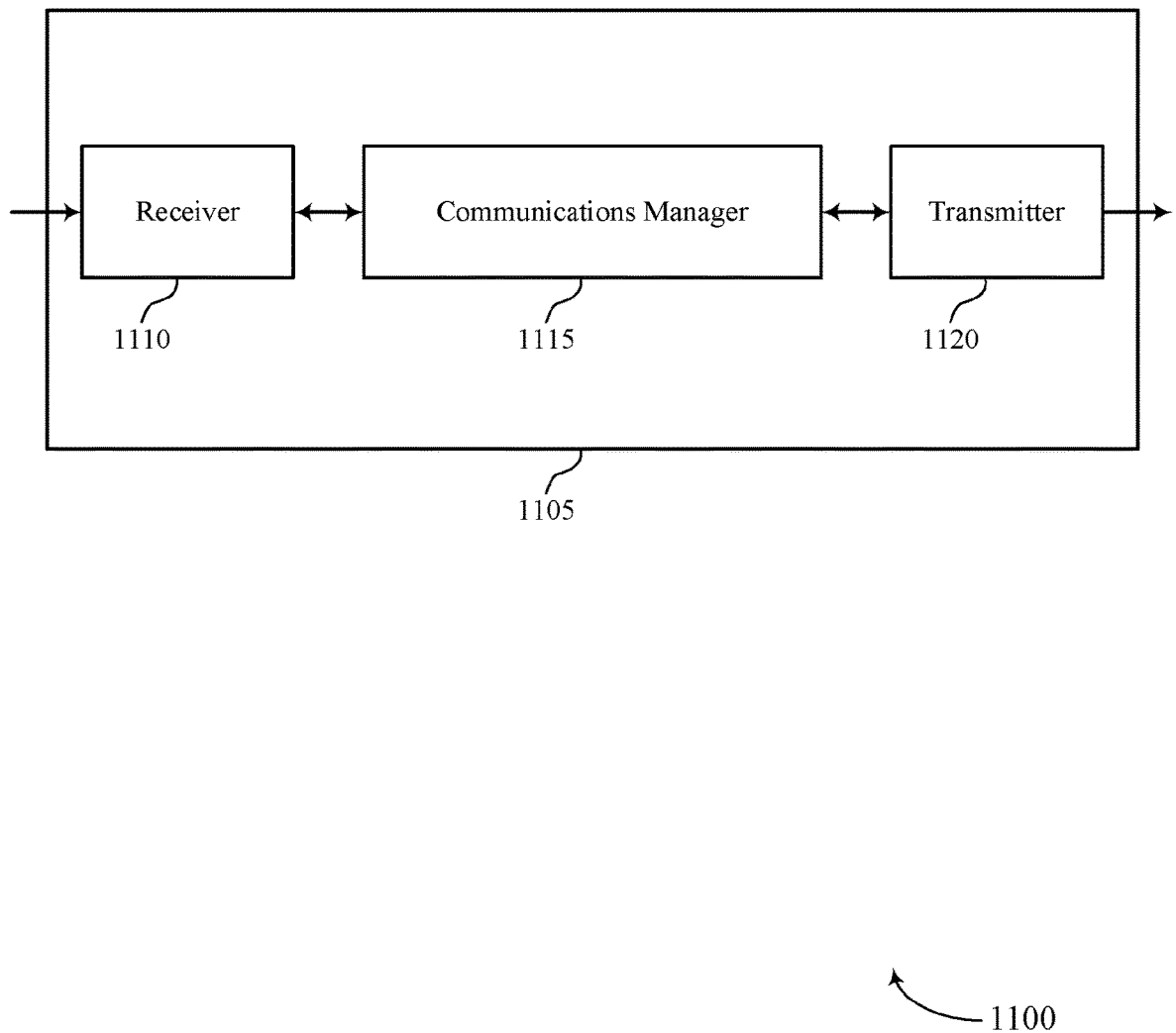
FIGS. 11 and 12 show block diagrams of devices that support data transmission with expiration time in accordance with one or more aspects of the present disclosure.

FIG. 11 shows a block diagram 1100 of a device 1105 that supports data transmission with expiration time in accordance with one or more aspects of the present disclosure. The device 1105 may be an example of aspects of a base station 105 (e.g. a network node) as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to data transmission with expiration time, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may transmit, to a UE, a control message while the UE is in a control mode. In some examples, the control message may be encrypted based on a security key. Additionally or alternatively, the control message may include an uplink grant associated with a duration (e.g., an expiration timer). The communication manager 1115 may receive, from the UE, an uplink transmission in accordance with the uplink grant associated with the duration while the UE is in the control mode. In some examples, the uplink transmission occurs before the duration lapses (e.g., before the expiration timer lapses). The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
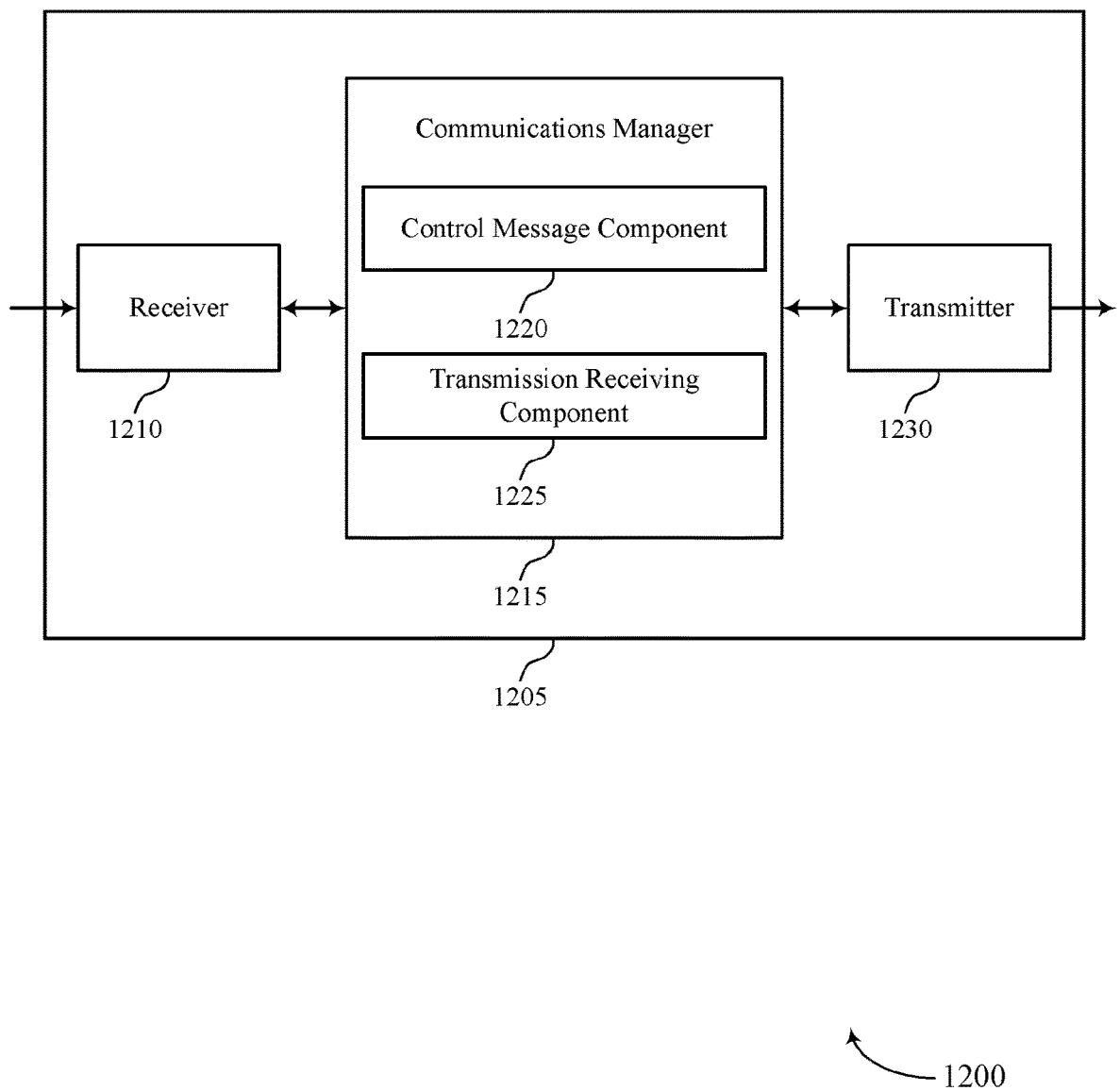

FIG. 12 shows a block diagram 1200 of a device 1205 that supports data transmission with expiration time in accordance with one or more aspects of the present disclosure. The device 1205 may be an example of aspects of a device 1105, or a base station 105 as described herein. The device 1205 may include a receiver 1210, a communications manager 1215, and a transmitter 1230. The device 1205 may also include a processor. Each of these components may be in communication with one another (e.g., via one or more buses).

The receiver 1210 may receive information such as packets, user data, or control information associated with various information channels (e.g., control channels, data channels, and information related to data transmission with expiration time, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a control message component 1220 and a transmission receiving component 1225. The communications manager 1215 may be an example of aspects of the communications manager 1410 described herein.

The control message component 1220 may transmit, to a UE, a control message while the UE is in a control mode. In some examples, the control message may be encrypted based on a security key. Additionally or alternatively, the control message may include an uplink grant associated with a duration (e.g., an expiration timer). The transmission receiving component 1225 may receive, from the UE, an uplink transmission in accordance with the uplink grant associated with the duration while the UE is in the control mode. In some examples, the uplink transmission may occur before the duration lapses (e.g., before the expiration timer lapses).

The transmitter 1230 may transmit signals generated by other components of the device 1205. In some examples, the transmitter 1230 may be collocated with a receiver 1210 in a transceiver module. For example, the transmitter 1230 may be an example of aspects of the transceiver 1420 described with reference to FIG. 14. The transmitter 1230 may utilize a single antenna or a set of antennas.

Figure 13:
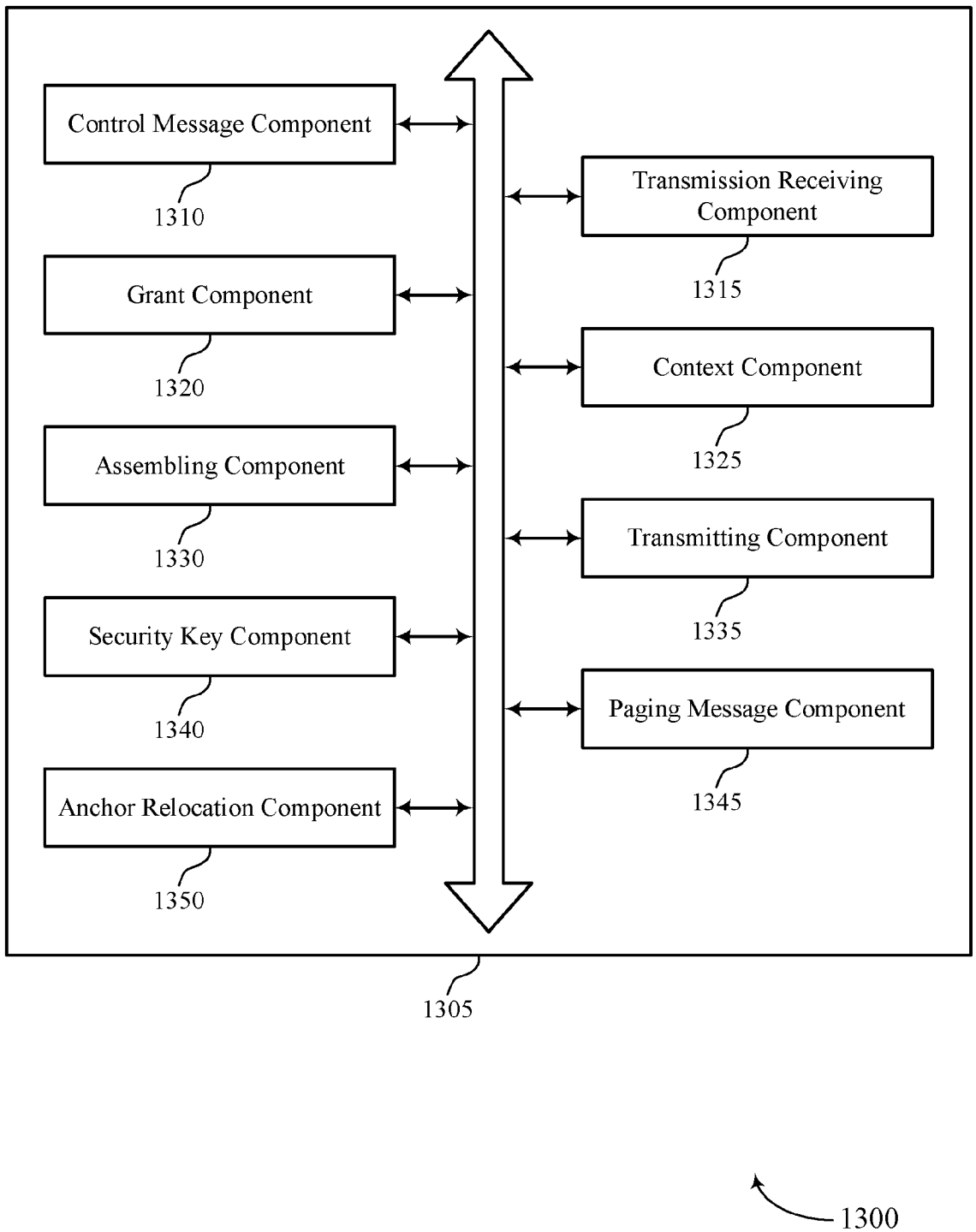
FIG. 13 shows a block diagram of a communications manager that supports data transmission with expiration time in accordance with one or more aspects of the present disclosure.

FIG. 13 shows a block diagram 1300 of a communications manager 1305 that supports data transmission with expiration time in accordance with one or more aspects of the present disclosure. The communications manager 1305 may be an example of aspects of a communications manager 1115, a communications manager 1215, or a communications manager 1410 described herein. The communications manager 1305 may include a control message component 1310, a transmission receiving component 1315, a grant component 1320, a context component 1325, an assembling component 1330, a transmitting component 1335, a security key component 1340, a paging message component 1345, and an anchor relocation component 1350. Each of these modules may communicate, directly or indirectly, with one another (e.g., via one or more buses).

The control message component 1310 may transmit, to a UE, a control message while the UE is in a control mode. In some examples, the control message may be encrypted based on a security key. Additionally or alternatively, the control message may include an uplink grant associated with a duration. In some examples, the duration may relate to a timer, such as an expiration timer, for example. In some examples, the control message component 1310 may transmit, to the UE, the control message including a contention resolution message and the determined uplink grant. In some cases, the uplink grant associated with the duration includes at least one of a semi-persistent uplink resource with the duration, a dedicated uplink resource with the duration, or a combination thereof. In some cases, the control mode includes an RRC inactive mode.

The transmission receiving component 1315 may receive, from the UE, an uplink transmission in accordance with the uplink grant while the UE is in the control mode, where the uplink transmission occurs before the expiration timer lapses. In some examples, the transmission receiving component 1315 may receive, from the UE, a multiplexed uplink transmission in accordance with the uplink grant, where the uplink transmission is multiplexed with a second control message including an indication for the UE to remain in the control mode. In some examples, the transmission receiving component 1315 may receive, from the UE, a second uplink transmission including a buffer status report, where the second uplink transmission occurs before the uplink transmission. In some examples, the transmission receiving component 1315 may receive, from the UE, a second uplink transmission including a buffer status report, one or more uplink RLC PDU segments, or a combination thereof, where the second uplink transmission occurs before the uplink transmission. In some examples, the transmission receiving component 1315 may receive, from the UE, a second control message in response to the paging message, the second control message including a resume request message. In some cases, the second control message includes a release complete message. In some cases, a data size of the uplink transmission is greater than a data size of a system information broadcast transmission.

The grant component 1320 may determine the uplink grant to be included in the control message based on the buffer status report, a network configuration, or a combination thereof. In some examples, the grant component 1320 may determine the uplink grant to be included in the control message based on the buffer status report, the one or more uplink RLC PDU segments, or a combination thereof. The context component 1325 may transmit, to an anchor network node, a request to retrieve a context associated with the UE. In some examples, the context component 1325 may receive, from the anchor network node, a response indicating a failure to retrieve the context associated with the UE, where transmitting the control message is based on the received response. In some examples, the context component 1325 may transmit, to the anchor network node, a request to retrieve a context associated with the UE, the request including a downlink forwarding tunneling information. In some examples, the context component 1325 may transmit, to the anchor network node, a request to retrieve a context associated with the UE.

In some examples, the context component 1325 may receive, from the anchor network node, a response indicating the context associated with the UE. In some cases, the request to retrieve the context associated with the UE includes at least one of a PDCP PDU associated with a logical channel identifier, an indication of a subsequent uplink transmission, or a combination thereof. In some cases, the response indicating the failure to retrieve the context associated with the UE includes at least one of an RRC container, a downlink PDCP PDU associated with a logical channel identifier, or a combination thereof. The assembling component 1330 may assemble the RLC PDU segments based on the second uplink transmission. The transmitting component 1335 may transmit, to an anchor network node, the assembled RLC PDU segments. In some examples, the transmitting component 1335 may transmit, to the UE, the paging message prior to transmitting the control message.

The security key component 1340 may determine the security key shared between the UE and the network node. In some examples, the security key component 1340 may indicate the security key shared between the UE and the network node using the control message, where the uplink transmission is secured using the indicated security key. In some examples, the security key component 1340 may transmit, to an AMF, a request for the security key based on the response confirming the request for anchor relocation. In some examples, the security key component 1340 may receive, from the AMF, the security key, where transmitting the control message is based on the received security key. The paging message component 1345 may receive, from an anchor network node, a paging message including a downlink data forwarding indication. The anchor relocation component 1350 may transmit, to the anchor network node, the request for anchor relocation, the request for anchor relocation including a downlink forwarding tunneling information. In some examples, the anchor relocation component 1350 may receive, from the anchor network node, a response confirming the request for anchor relocation.

Figure 14:
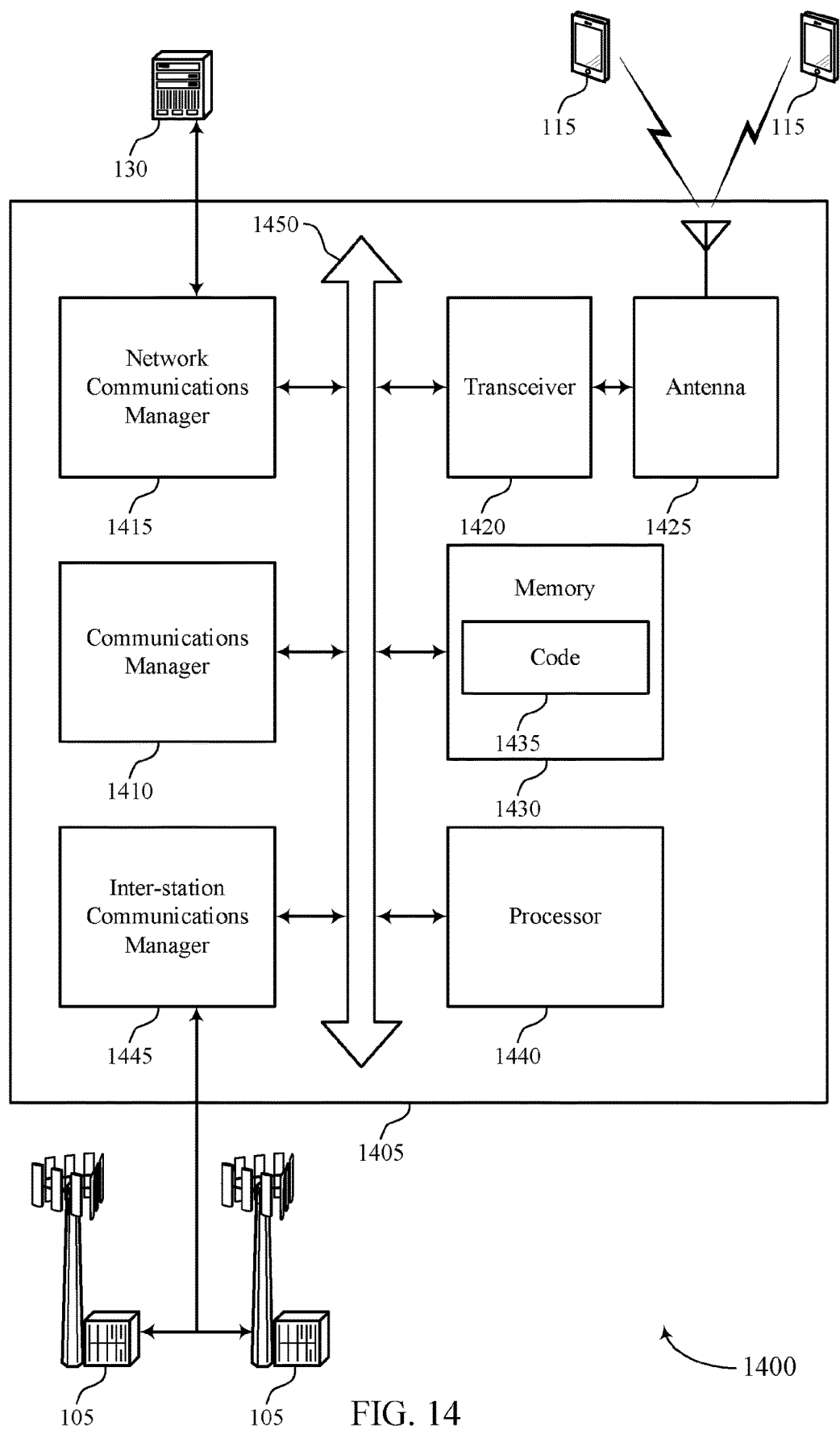
FIG. 14 shows a diagram of a system including a device that supports data transmission with expiration time in accordance with one or more aspects of the present disclosure.

FIG. 14 shows a diagram of a system 1400 including a device 1405 that supports data transmission with expiration time in accordance with one or more aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may transmit, to a UE, a control message while the UE is in a control mode. In some examples, the control message may be encrypted based on a security key. Additionally or alternatively, the control message may include an uplink grant associated with a duration (e.g., an expiration timer). The communications manager 1410 may receive, from the UE, an uplink transmission in accordance with the uplink grant associated with the duration while the UE is in the control mode, where the uplink transmission occurs before the duration lapses (e.g., before the expiration timer lapses).

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described herein. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas. In some cases, the device 1205 may include a single antenna 1425. However, in some cases the device 1205 may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting data transmission with expiration time).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
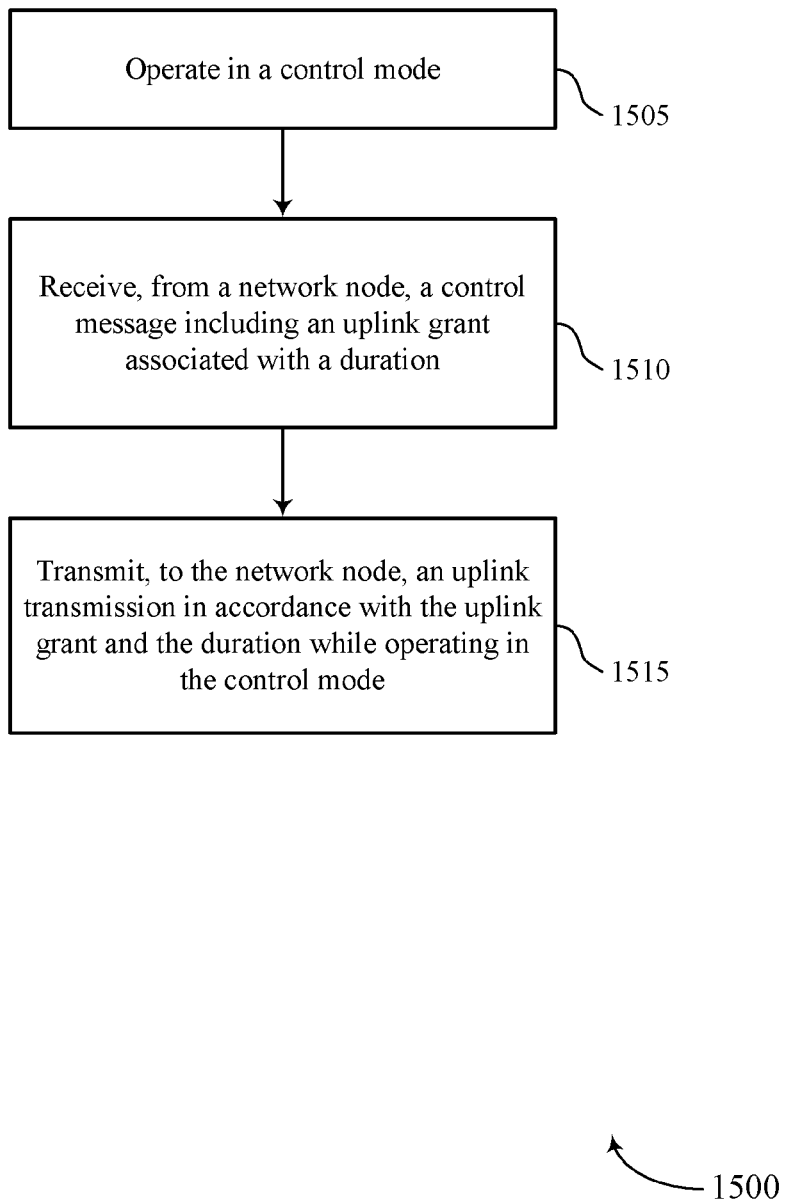
FIGS. 15 through 18 show flowcharts illustrating methods that support data transmission with expiration time in accordance with one or more aspects of the present disclosure.

FIG. 15 shows a flowchart illustrating a method 1500 that supports data transmission with expiration time in accordance with one or more aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1505, the UE may operate in a control mode. The operations of 1505 may be performed according to the methods described herein. In some examples, aspects of the operations of 1505 may be performed by a control mode component as described with reference to FIGS. 7 through 10.

At 1510, the UE may receive, from a network node, a control message including an uplink grant associated with a duration. The operations of 1510 may be performed according to the methods described herein. In some examples, aspects of the operations of 1510 may be performed by a control message component as described with reference to FIGS. 7 through 10.

At 1515, the UE may transmit, to the network node, an uplink transmission in accordance with the uplink grant and the duration while operating in the control mode. The operations of 1515 may be performed according to the methods described herein. In some examples, aspects of the operations of 1515 may be performed by an uplink transmission component as described with reference to FIGS. 7 through 10.

Figure 16:
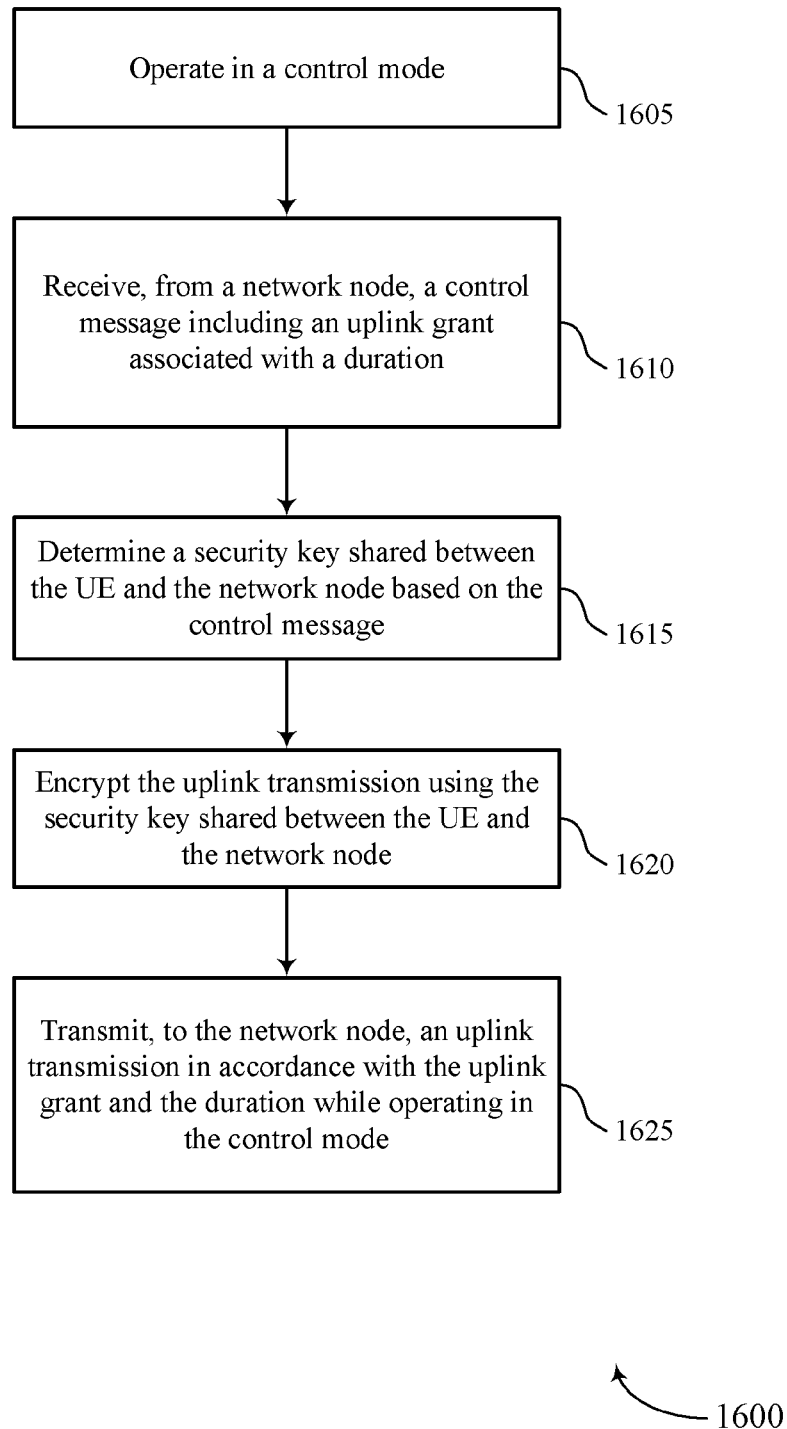

FIG. 16 shows a flowchart illustrating a method 1600 that optionally supports data transmission with expiration time in accordance with one or more aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1605, the UE may operate in a control mode. The operations of 1605 may be performed according to the methods described herein. In some examples, aspects of the operations of 1605 may be performed by a control mode component as described with reference to FIGS. 7 through 10.

At 1610, the UE may receive, from a network node, a control message including an uplink grant associated with a duration. The operations of 1610 may be performed according to the methods described herein. In some examples, aspects of the operations of 1610 may be performed by a control message component as described with reference to FIGS. 7 through 10.

At 1615, the UE may determine a security key shared between the UE and the network node based on the control message. The operations of 1615 may be performed according to the methods described herein. In some examples, aspects of the operations of 1615 may be performed by a security key component as described with reference to FIGS. 7 through 10.

At 1620, the UE may encrypt the uplink transmission using the security key shared between the UE and the network node. The operations of 1620 may be performed according to the methods described herein. In some examples, aspects of the operations of 1620 may be performed by an encrypting component as described with reference to FIGS. 7 through 10.

At 1625, the UE may transmit, to the network node, an uplink transmission in accordance with the uplink grant and the duration while operating in the control mode. The operations of 1625 may be performed according to the methods described herein. In some examples, aspects of the operations of 1625 may be performed by an uplink transmission component as described with reference to FIGS. 7 through 10.

Figure 17:
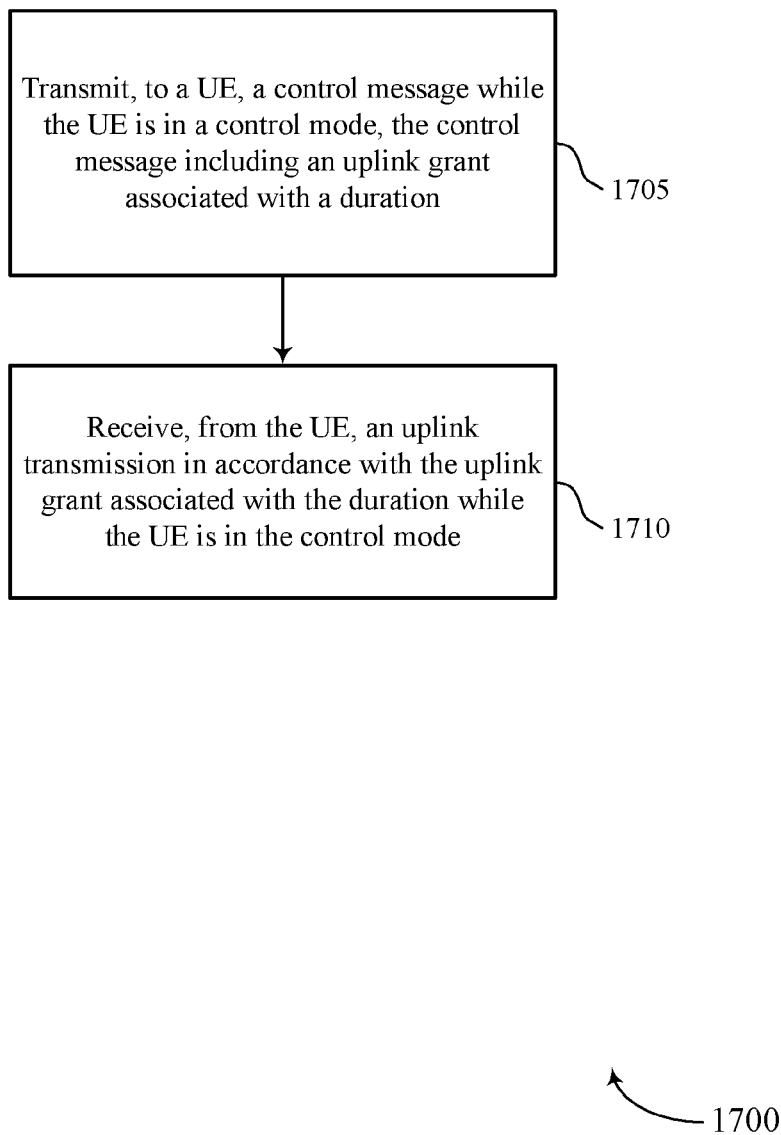

FIG. 17 shows a flowchart illustrating a method 1700 that supports data transmission in accordance with one or more aspects of the present disclosure. The operations of method 1700 may be implemented by a base station 105 or its components as described herein. In some cases, the base station 105 may be a network node. For example, the operations of method 1700 may be performed by a communications manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 1705, the base station may transmit, to a UE, a control message while the UE is in a control mode. In some examples, the control message may be encrypted based on a security key. Additionally or alternatively, the control message may include an uplink grant associated with an expiration timer. The operations of 1705 may be performed according to the methods described herein. In some examples, aspects of the operations of 1705 may be performed by a control message component as described with reference to FIGS. 11 through 14.

At 1710, the base station may receive, from the UE, an uplink transmission in accordance with the uplink grant associated with the duration while the UE is in the control mode. In some examples, the duration may relate to a timer, such as an expiration timer, and the uplink transmission may occur before the expiration timer lapses. The operations of 1710 may be performed according to the methods described herein. In some examples, aspects of the operations of 1710 may be performed by a transmission receiving component as described with reference to FIGS. 11 through 14.

Figure 18:
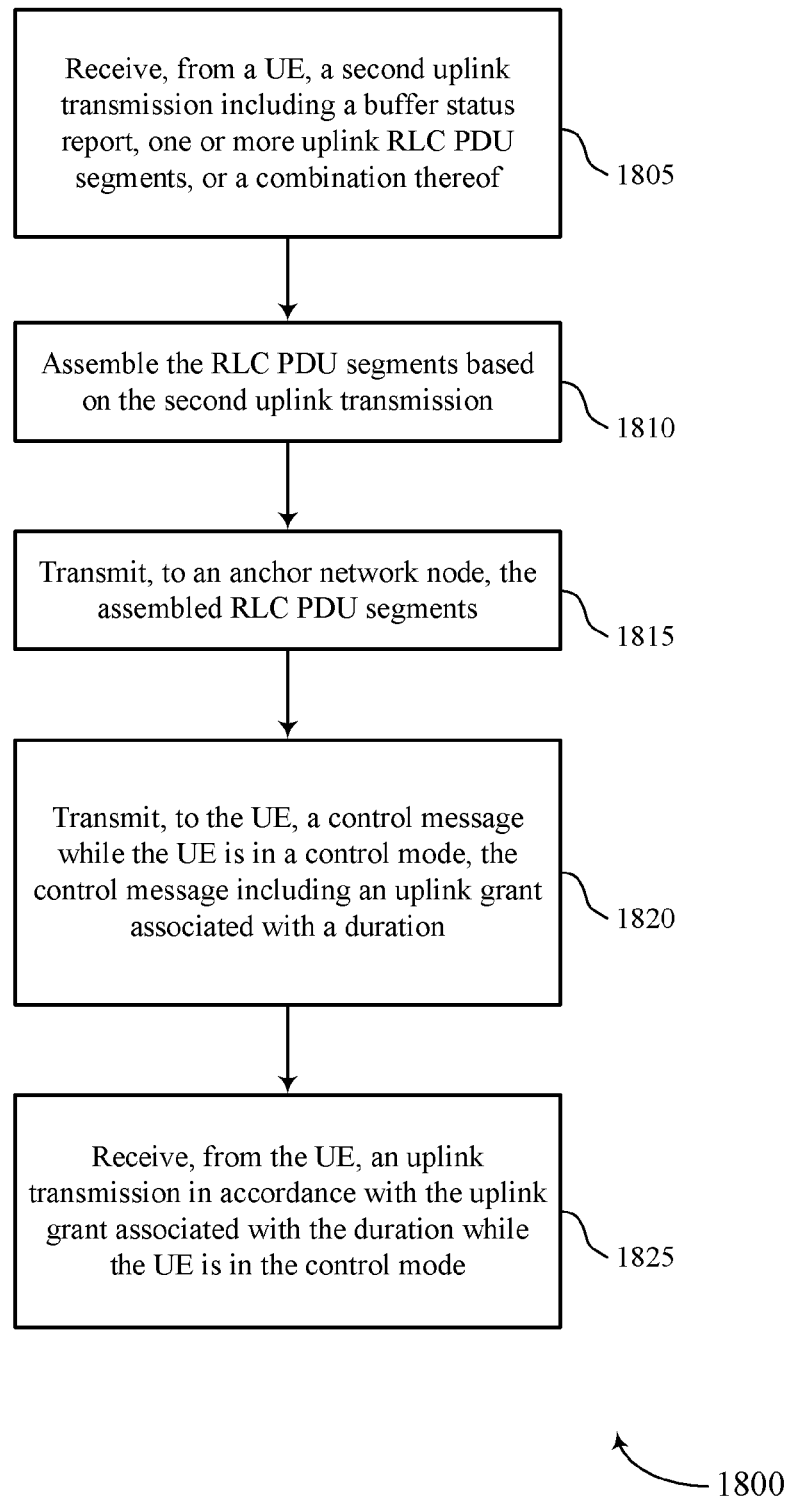

FIG. 18 shows a flowchart illustrating a method 1800 that supports data transmission with expiration time in accordance with one or more aspects of the present disclosure. The operations of method 1800 may be implemented by a base station 105 or its components as described herein. In some cases, the base station 105 may be a network node. For example, the operations of method 1800 may be performed by a communications manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 1805, the base station may receive, from a UE, a second uplink transmission including a buffer status report, one or more uplink RLC PDU segments, or a combination thereof. In some examples, the second uplink transmission may occur before an uplink transmission. The operations of 1805 may be performed according to the methods described herein. In some examples, aspects of the operations of 1805 may be performed by a transmission receiving component as described with reference to FIGS. 11 through 14.

At 1810, the base station may assemble the RLC PDU segments based on the second uplink transmission. The operations of 1810 may be performed according to the methods described herein. In some examples, aspects of the operations of 1810 may be performed by an assembling component as described with reference to FIGS. 11 through 14.

At 1815, the base station may transmit, to an anchor network node, the assembled RLC PDU segments. The operations of 1815 may be performed according to the methods described herein. In some examples, aspects of the operations of 1815 may be performed by a transmitting component as described with reference to FIGS. 11 through 14.

At 1820, the base station may transmit, to the UE, a control message while the UE is in a control mode, the control message including an uplink grant associated with a duration. In some examples, the control message may be encrypted based on a security key. Additionally or alternatively, the control message may include an uplink grant associated with a duration. The operations of 1820 may be performed according to the methods described herein. In some examples, aspects of the operations of 1820 may be performed by a control message component as described with reference to FIGS. 11 through 14.

At 1825, the base station may receive, from the UE, an uplink transmission in accordance with the uplink grant associated with the duration while the UE is in the control mode. The operations of 1825 may be performed according to the methods described herein. In some examples, aspects of the operations of 1825 may be performed by a transmission receiving component as described with reference to FIGS. 11 through 14.

It should be noted that the methods described herein describe possible implementations, and that the operations may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers. A gNB for a macro cell may be referred to as a macro gNB. A gNB for a small cell may be referred to as a small cell gNB, a pico gNB, a femto gNB, or a home gNB. A gNB may support one or multiple (e.g., two, three, four, and the like) cells (e.g., component carriers).

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    receiving, from a network node, a Radio Resource Control (RRC) release message comprising a suspend configuration together with an uplink grant associated with an expiration timer;
    operating an RRC inactive state; and
    transmitting, to the network node, a small data transmission in accordance with the uplink grant while remaining in the RRC inactive state before the expiration timer lapses.

2. The method of claim 1, wherein the RRC release message is encrypted based at least in part on a security key.

3. The method of claim 1, further comprising:
    transmitting, to the network node, a second uplink transmission comprising a buffer status report,
    wherein the second uplink transmission occurs before the small data transmission.

4. The method of claim 3, wherein the uplink grant is based at least in part on the buffer status report, a network configuration, or a combination thereof.

5. The method of claim 1, further comprising:
    transmitting, to the network node, a second uplink transmission comprising a buffer status report, one or more uplink Radio Link Control (RLC) Protocol Data Unit (RLC PDU) segments, or a combination thereof,
    wherein the second uplink transmission occurs before the small data transmission.

6. The method of claim 5, further comprising:
receiving, from the network node, the RRC release message based at least in part on the buffer status report, the one or more uplink RLC PDU segments, or a combination thereof,
wherein the RRC release message comprises a contention resolution message and the uplink grant associated with the expiration timer.

7. The method of claim 1, further comprising:
determining a security key shared between the UE and the network node based at least in part on the RRC release message; and
encrypting the small data transmission using the security key shared between the UE and the network node.

8. The method of claim 1, further comprising:
receiving, from the network node, a paging message prior to receiving the RRC release message, the paging message comprising a downlink data forwarding indication; and
transmitting a second RRC release message in response to the paging message, the second RRC release message comprising a resume request message.

9. The method of claim 1, wherein the uplink grant associated with the expiration timer comprises at least one of a semi-persistent uplink resource associated with the expiration timer, a dedicated uplink resource associated with the expiration timer, or a combination thereof.

10. The method of claim 1, wherein a data size of the small data transmission is greater than a data size of a system information broadcast transmission.

11. A method for wireless communication at a network node, comprising:
transmitting, to a user equipment (UE), a Radio Resource Control (RRC) release message together with an uplink grant associated with an expiration timer, wherein the RRC release message comprises a suspend configuration; and
receiving, from the UE, a small data transmission in accordance with the uplink grant while the UE is in a RRC inactive state before the expiration timer lapses.

12. The method of claim 11, further comprising: encrypting the RRC release message based at least in part on a security key.

13. The method of claim 12, further comprising:
transmitting, to an access and mobility management function (AMF), a request for the security key based at least in part on a response confirming the request for anchor relocation; and
receiving, from the AMF, the security key, wherein transmitting the RRC release message is based at least in part on the received security key.

14. The method of claim 11, further comprising:
receiving, from the UE, a second uplink transmission comprising a buffer status report, wherein the second uplink transmission occurs before the small data transmission.

15. The method of claim 14, further comprising:
determining the uplink grant to be included in the RRC release message based at least in part on the buffer status report, a network configuration, or a combination thereof.

16. The method of claim 11, further comprising:
transmitting, to an anchor network node, a request to retrieve a context associated with the UE; and
receiving, from the anchor network node, a response indicating a failure to retrieve the context associated with the UE, wherein transmitting the RRC release message is based at least in part on the received response.

17. The method of claim 16, wherein the request to retrieve the context associated with the UE comprises at least one of a PDCP PDU associated with a logical channel identifier, an indication of a subsequent uplink transmission, or a combination thereof.

18. The method of claim 16, wherein the response indicating the failure to retrieve the context associated with the UE comprises at least one of a radio resource control container, a downlink Packet Data Convergence Protocol (PDCP) Protocol Data Unit (PDCP PDU) associated with a logical channel identifier, or a combination thereof.

19. The method of claim 11, further comprising:
receiving, from the UE, a second uplink transmission comprising a buffer status report, one or more uplink Radio Link Control Protocol Data Unit (RLC PDU) segments, or a combination thereof, wherein the second uplink transmission occurs before the small data transmission;
assembling the RLC PDU segments based at least in part on the second uplink transmission; and
transmitting, to an anchor network node, the assembled RLC PDU segments.

20. The method of claim 19, further comprising:
determining the uplink grant to be included in the RRC release message based at least in part on the buffer status report, the one or more uplink RLC PDU segments, or a combination thereof; and
transmitting, to the UE, the RRC release message comprising a contention resolution message and the determined uplink grant.

21. The method of claim 11, further comprising:
transmitting, to an anchor network node, a request to retrieve a context associated with the UE, the request comprising a downlink forwarding tunneling information; and
receiving, from the anchor network node, a response indicating a failure to retrieve the context associated with the UE,
wherein transmitting the RRC release message is based at least in part on the received response.

22. The method of claim 11, further comprising:
transmitting, to an anchor network node, a request to retrieve a context associated with the UE;
receiving, from the anchor network node, a response indicating the context associated with the UE;
transmitting, to the anchor network node, the request for anchor relocation, the request for anchor relocation comprising a downlink forwarding tunneling information; and
receiving, from the anchor network node, a response confirming the request for anchor relocation.

23. The method of claim 11, wherein the uplink grant associated with the expiration timer comprises at least one of a semi-persistent uplink resource associated with the expiration timer, a dedicated uplink resource associated with the expiration timer, or a combination thereof.

24. The method of claim 11, wherein a data size of the small data transmission is greater than a data size of a system information broadcast transmission.

25. An apparatus for wireless communication at a user equipment (UE), comprising:
means for receiving, from a network node, a Radio Resource Control (RRC) release message comprising a suspend configuration together with an uplink grant associated with an expiration timer;

means for operating in an RRC inactive state; and means for transmitting, to the network node, a small data transmission in accordance with the uplink grant while remaining in the RRC inactive state before the expiration timer lapses.

26. An apparatus for wireless communication at a network node, comprising:

means for transmitting, to a user equipment (UE), a Radio Resource Control (RRC) release message, the RRC release message together with an uplink grant associated with an expiration timer, wherein the RRC release message includes a suspend configuration; and means for receiving, from the UE, small data transmission in accordance with the uplink grant while the UE is in a RRC inactive state before the expiration timer lapses.

* * * * *